Oct. 11, 1938.　　　　O. E. WOLFF　　　　2,132,451
MACHINE FOR SEPARATING, COUNTING, AND DELIVERING SHEET MATERIAL
Filed Oct. 7, 1935　　　17 Sheets-Sheet 1
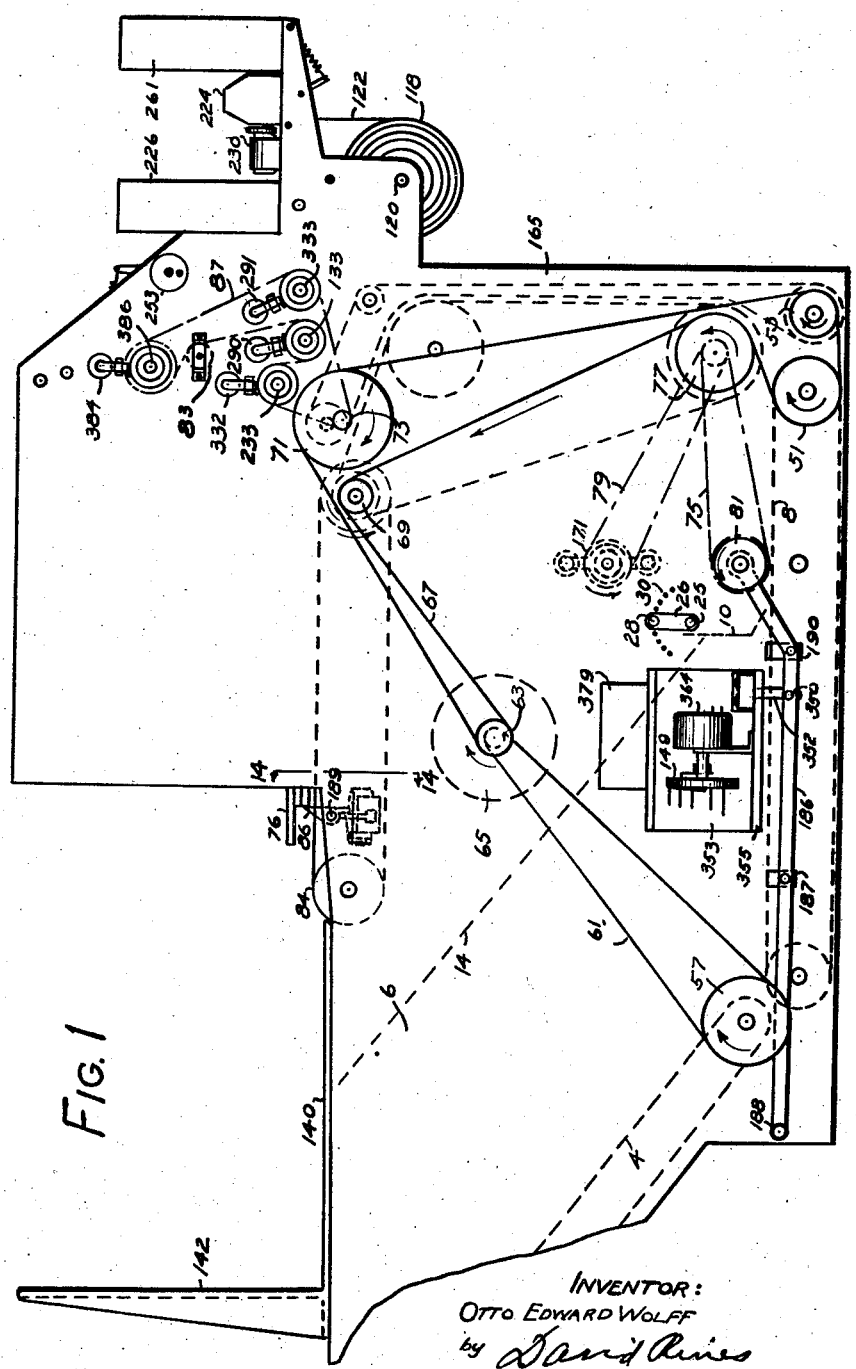
INVENTOR:
OTTO EDWARD WOLFF
by David Rines
ATTORNEY

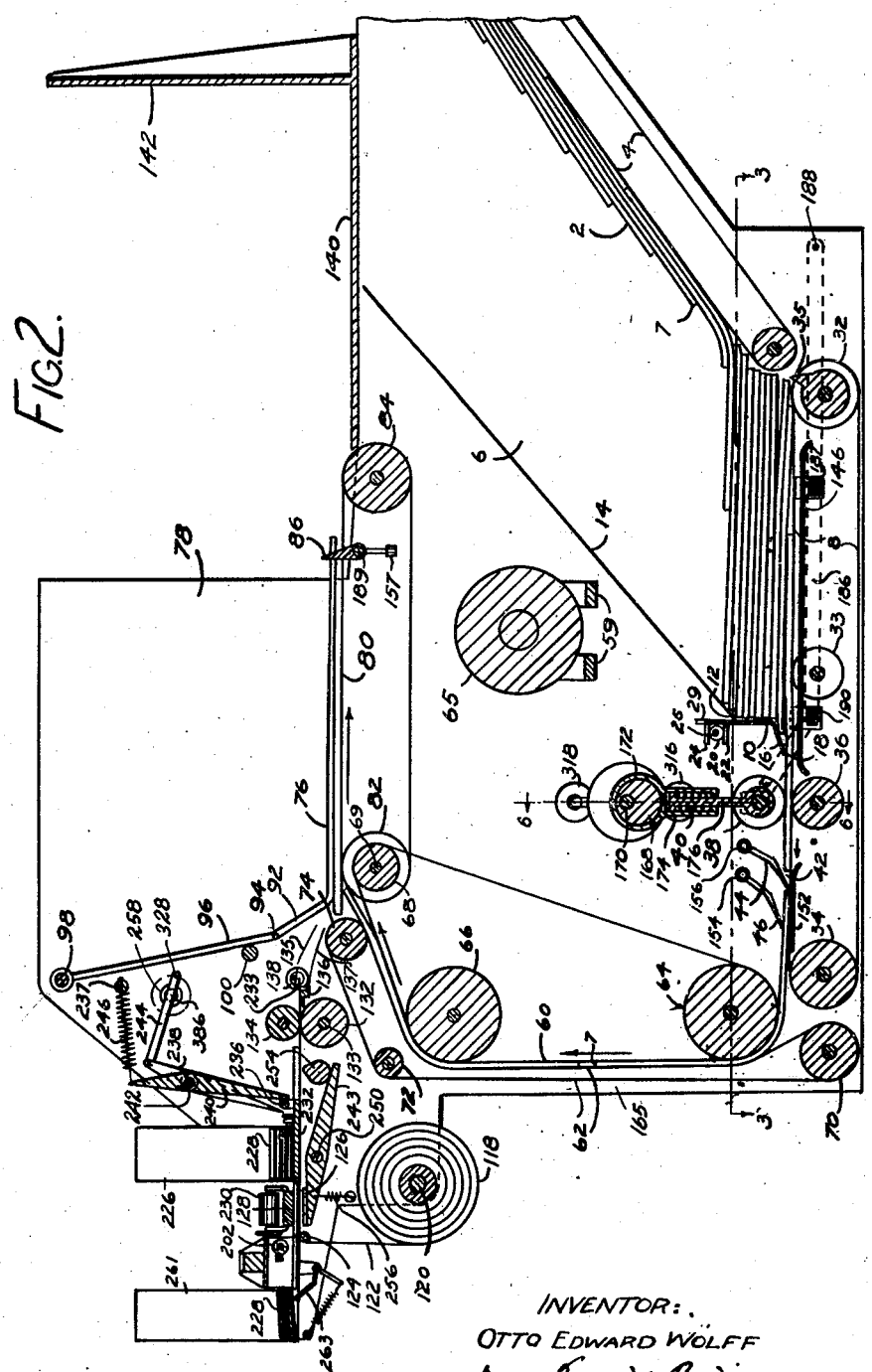

Oct. 11, 1938.     O. E. WOLFF     2,132,451
MACHINE FOR SEPARATING, COUNTING, AND DELIVERING SHEET MATERIAL
Filed Oct. 7, 1935     17 Sheets-Sheet 3

INVENTOR:
OTTO EDWARD WOLFF
by David Rines
ATTORNEY.

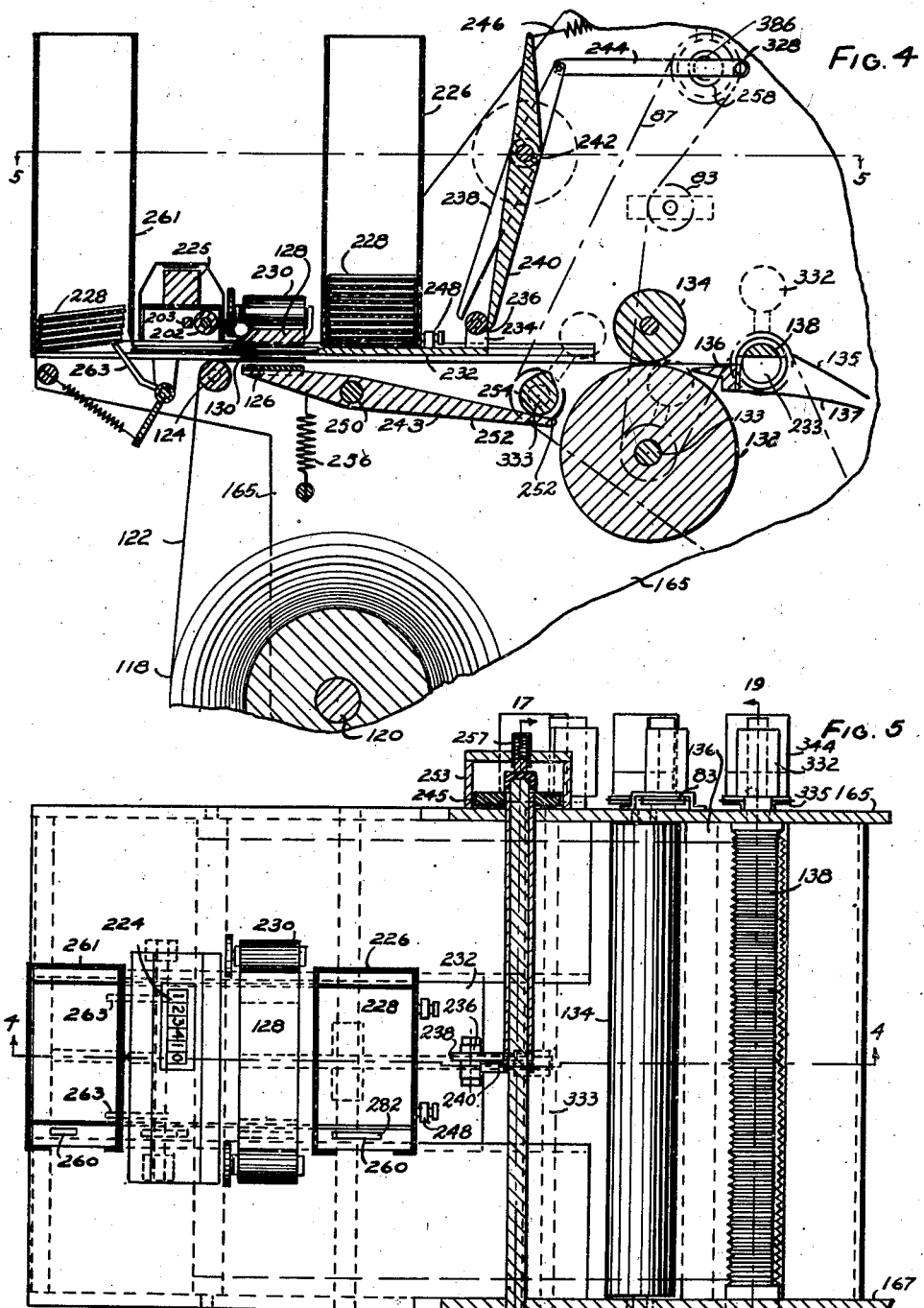

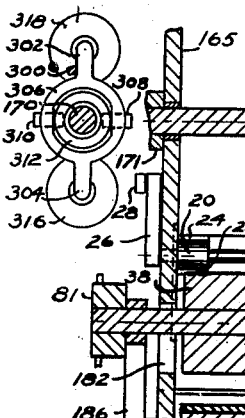
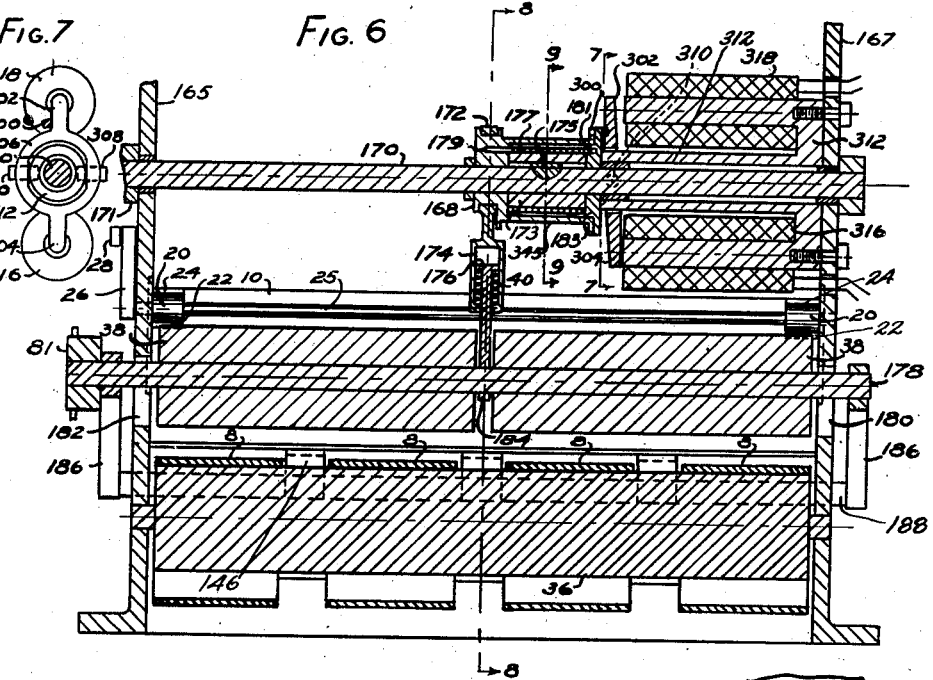
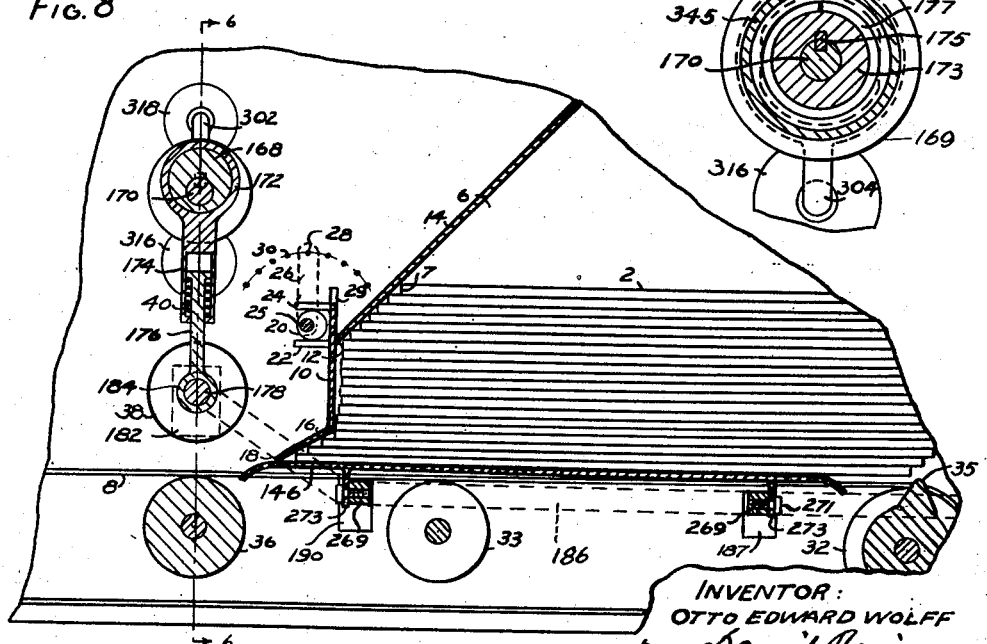

Oct. 11, 1938. O. E. WOLFF 2,132,451
MACHINE FOR SEPARATING, COUNTING, AND DELIVERING SHEET MATERIAL
Filed Oct. 7, 1935 17 Sheets-Sheet 6

INVENTOR:
OTTO EDWARD WOLFF
by David Rines
ATTORNEY

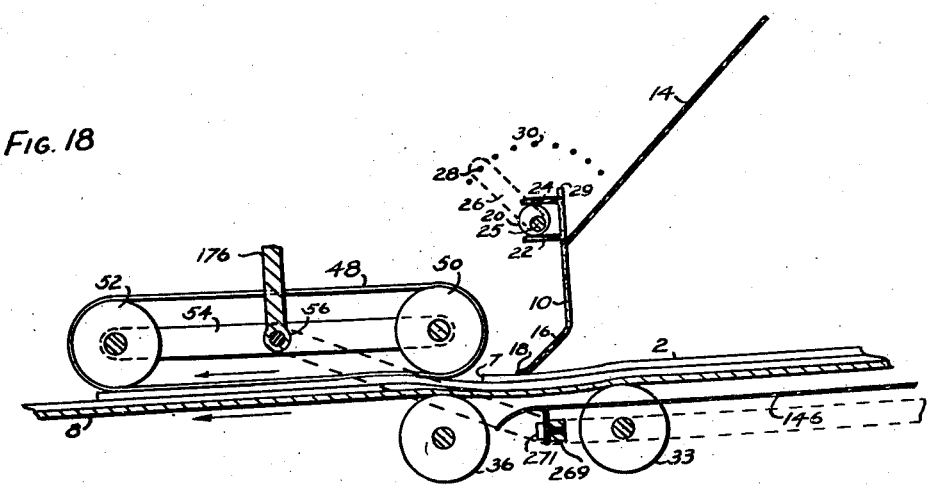

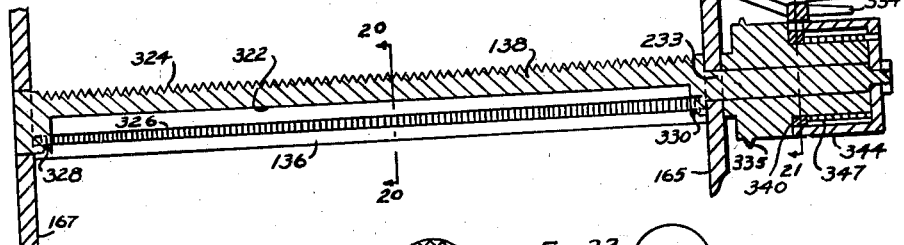
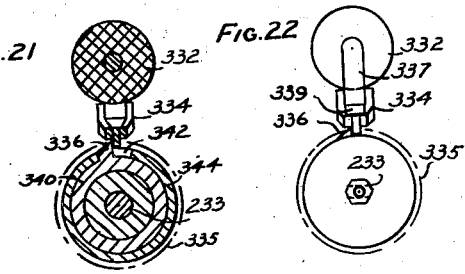
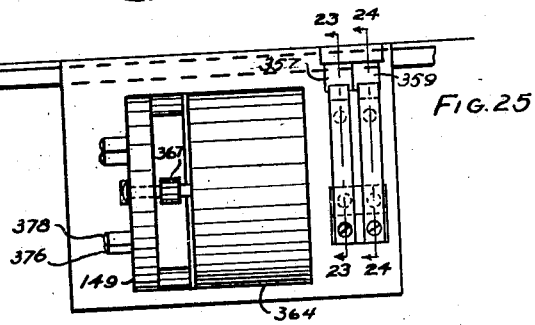
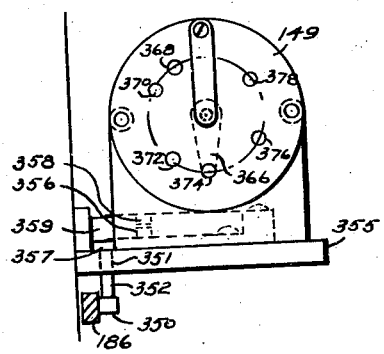
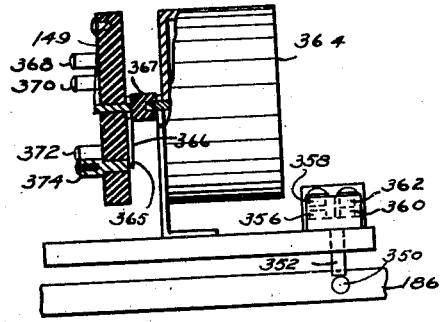

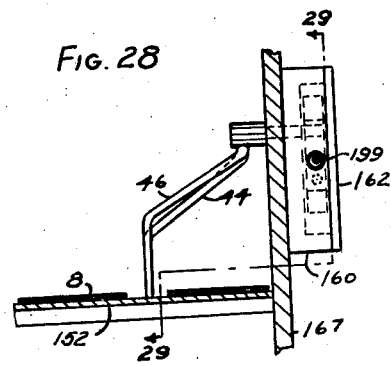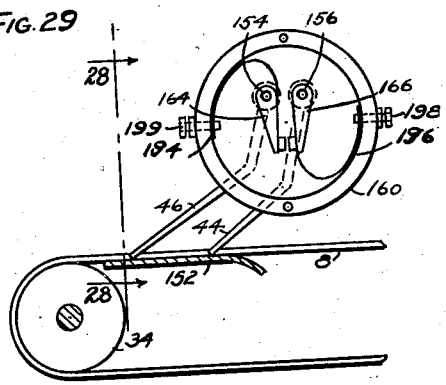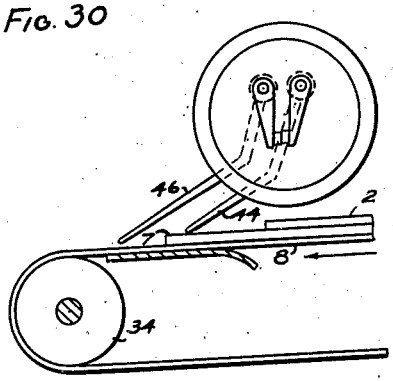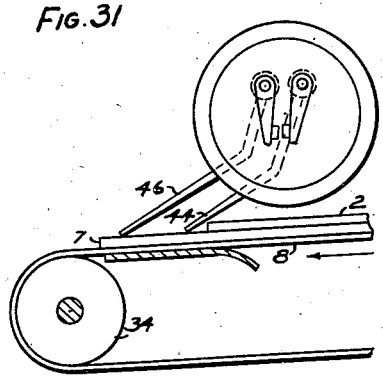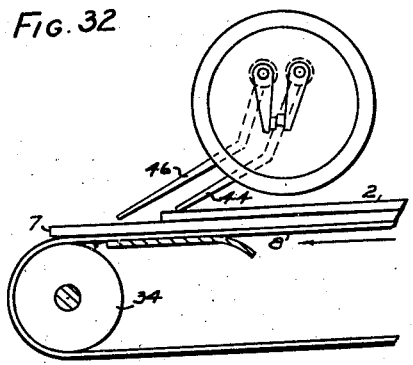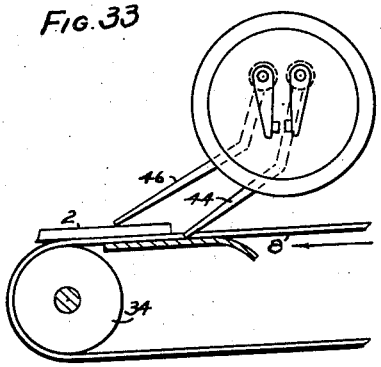

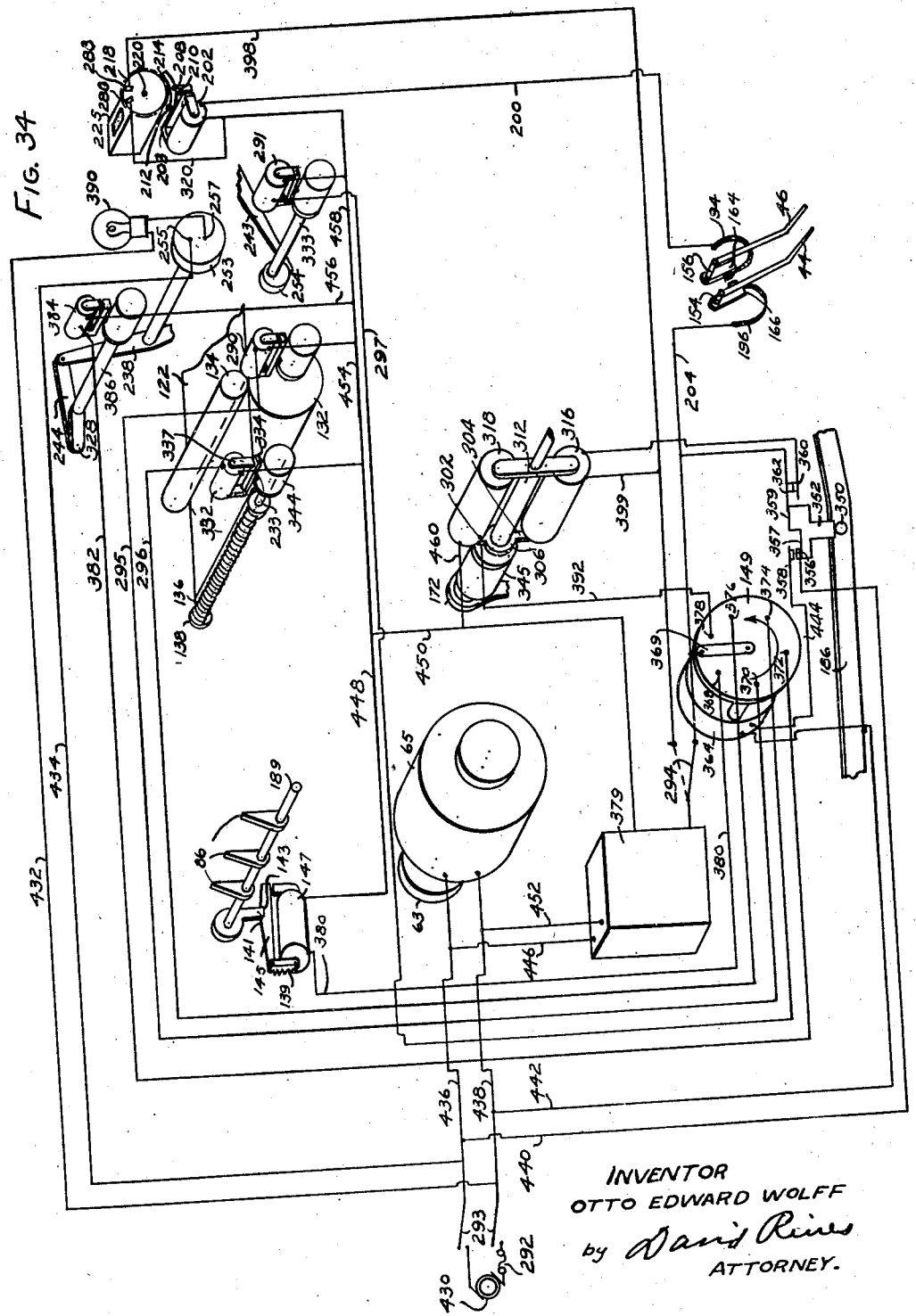

Oct. 11, 1938.　　　　　O. E. WOLFF　　　　　2,132,451
MACHINE FOR SEPARATING, COUNTING, AND DELIVERING SHEET MATERIAL
Filed Oct. 7, 1935　　　　17 Sheets-Sheet 11

Fig. 35

INVENTOR:
OTTO EDWARD WOLFF
by David Rines
ATTORNEY.

INVENTOR:
OTTO EDWARD WOLFF
ATTORNEY

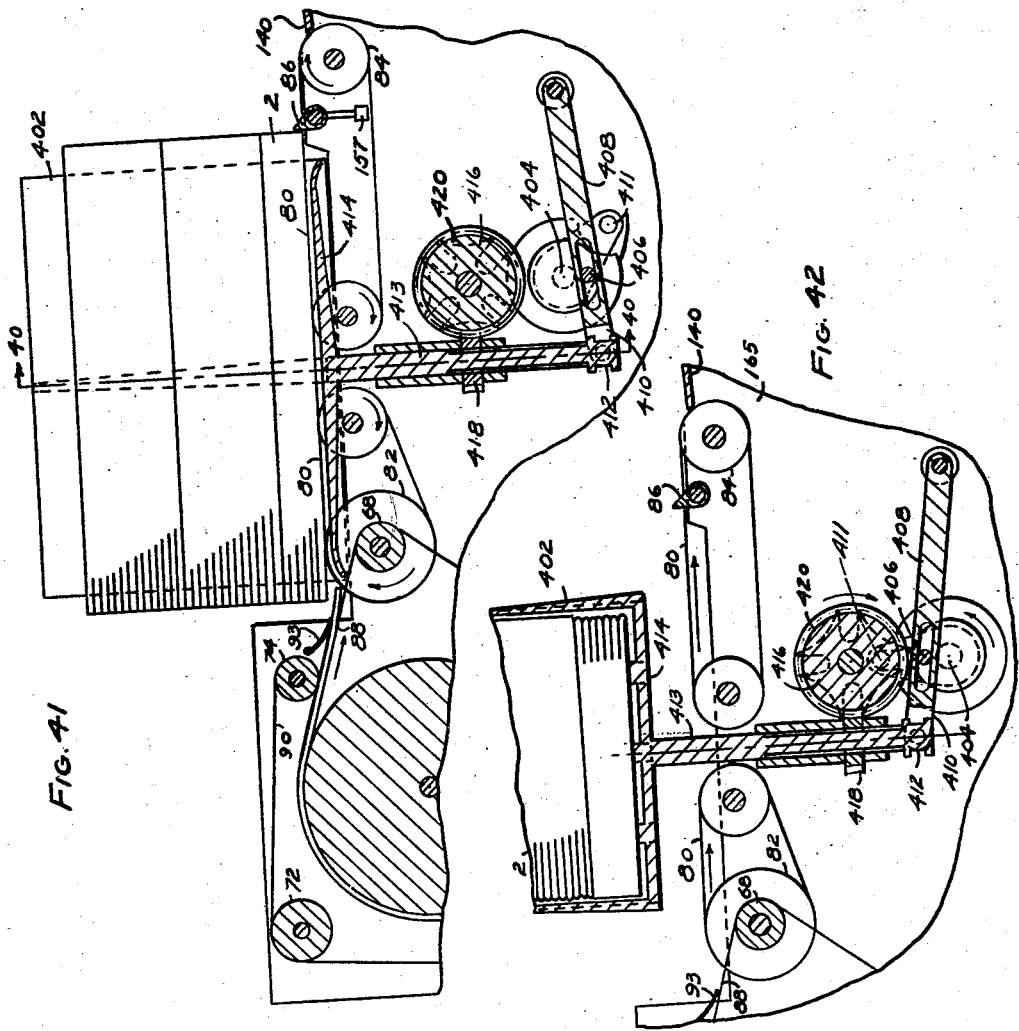
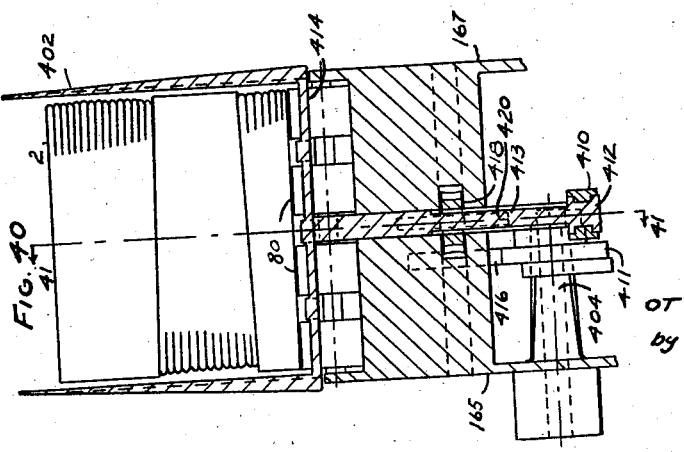

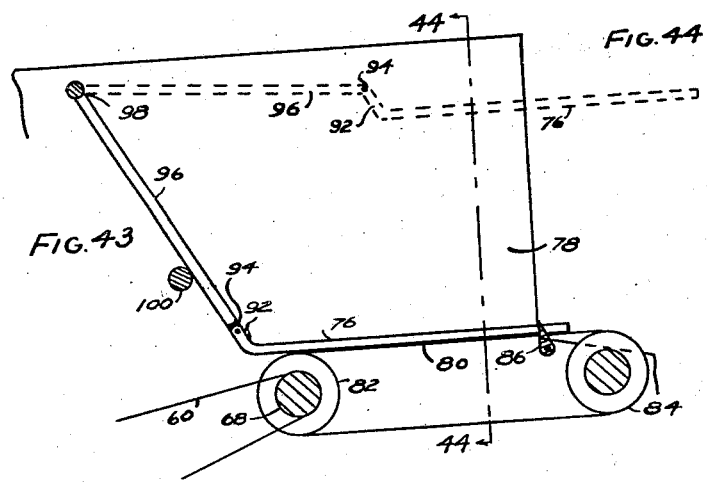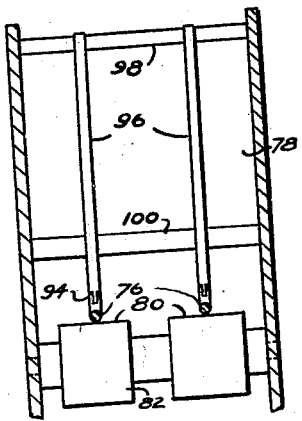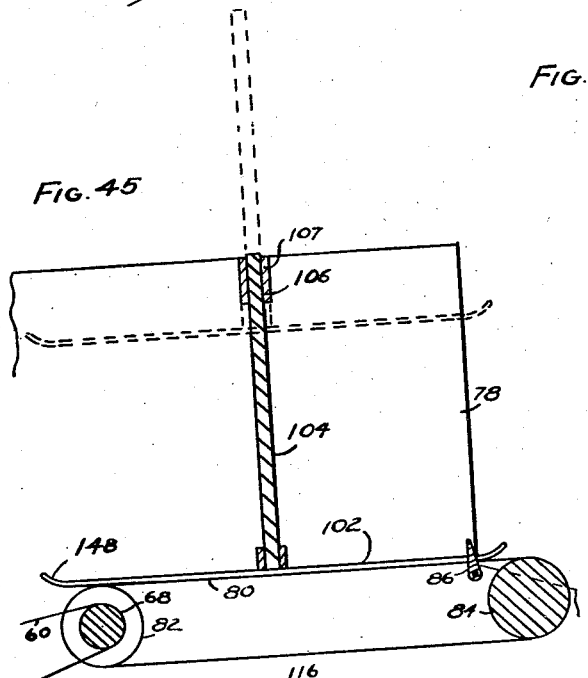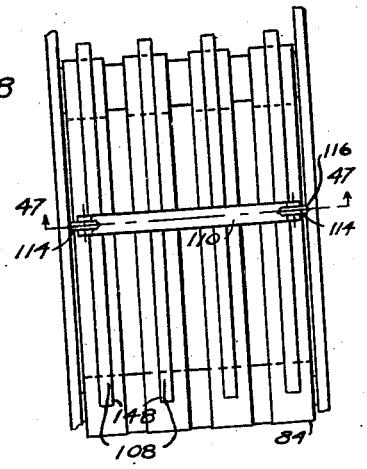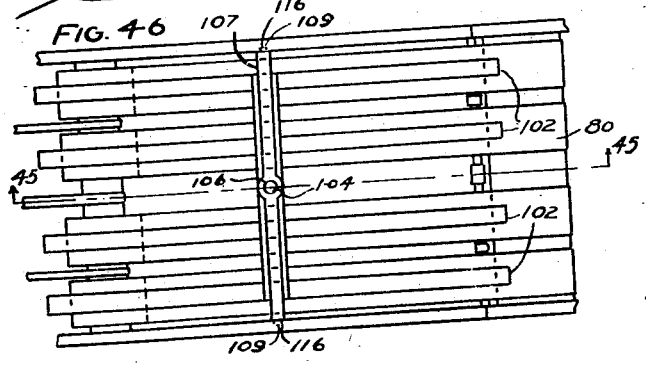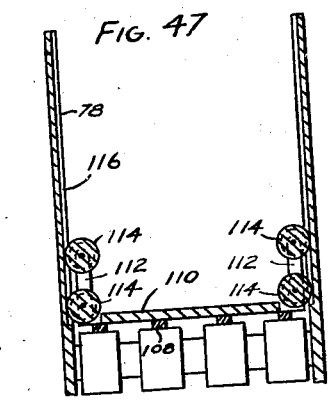

Oct. 11, 1938.  O. E. WOLFF  2,132,451
MACHINE FOR SEPARATING, COUNTING, AND DELIVERING SHEET MATERIAL
Filed Oct. 7, 1935  17 Sheets-Sheet 15

INVENTOR:
OTTO EDWARD WOLFF
by David Rines
ATTORNEY

Oct. 11, 1938.  O. E. WOLFF  2,132,451
MACHINE FOR SEPARATING, COUNTING, AND DELIVERING SHEET MATERIAL
Filed Oct. 7, 1935   17 Sheets-Sheet 16

INVENTOR:
OTTO EDWARD WOLFF
by David Rines
ATTORNEY

Oct. 11, 1938.  O. E. WOLFF  2,132,451
MACHINE FOR SEPARATING, COUNTING, AND DELIVERING SHEET MATERIAL
Filed Oct. 7, 1935  17 Sheets—Sheet 17

INVENTOR:
OTTO EDWARD WOLFF
by David Rines
Attorney

Patented Oct. 11, 1938

2,132,451

UNITED STATES PATENT OFFICE 2,132,451

MACHINE FOR SEPARATING, COUNTING, AND DELIVERING SHEET MATERIAL

Otto Edward Wolff, Belmont, Mass., assignor, by mesne assignments, to Paul S. Bauer, Belmont, Mass., as trustee of the R. S. Bauer Trust Application October 7, 1935, Serial No. 43,928

36 Claims. (Cl. 101—58)

The present invention relates to means for handling sheet material, and more particularly such sheet material as newspapers and periodicals.

As the newspapers, for example, are delivered from the press, they are collected into bundles containing the proper number to be forwarded to the various newsdealers, and the bundles are then usually wrapped in preaddressed wrappers. These operations have heretofore been performed partly or wholly by hand.

An object of the present invention is to provide a new machine for automatically performing several or all of the various operations of separating the newspapers or other sheet material, counting them out, and delivering the counted objects.

A further object is to provide novel mechanism for performing any or all of the above-described operations.

Another object is to provide a novel machine the purpose of which is to permit the grouping or stacking of a predetermined number of the objects.

A feature of the invention resides in a novel construction according to which the hopper that contains the stack of sheets to be counted is provided with a wall or shield that extends down toward a conveyor on which the stack of sheets rests and that is adapted to separate out the lower sheet or sheets of the stack and convey them out of the hopper. The wall or shield has a lower portion inclining or sloping forward in the direction of travel of the conveyor. This sloping portion of the shield pushes back the upper sheets in the stack of sheets in the hopper and imparts a downward pressure to the leading edge of the sheets, thus overcoming any tendency for the sheets to stick that might otherwise exist, owing to rough edges and the like. The upper sheets may be advanced at a lower speed than the lower sheets, after leaving the hopper, so that they may become separated out from the lower sheets, causing the sheets to become lapped, after which they may be counted.

Another object is to provide a novel mechanism for accumulating a stack of sheets from below the stack.

A further object is to provide a novel, magnetically controlled, clutch-mechanism combination for clutching an intermittently operating member to a continuously operating member and unclutching the same after the member has performed its intended operation.

Other and further objects will be explained hereinafter, and will be particularly pointed out in the appended claims.

The invention will now be explained in connection with the accompanying drawings, in which Fig. 1 is a side elevation, looking from the rear side of the preferred machine, with parts broken away, and other parts in dotted lines, for clearness, and with the cover of the control box removed to show the master commutator, and showing the power drives from the motor to the various mechanisms, and the relative positions of the controlling relays;

Fig. 2 is a longitudinal vertical section, taken upon the line 2—2 of Fig. 3, looking in the direction of the arrows;

Fig. 3 is a horizontal section, upon the line 3—3 of Fig. 2, looking downward in the direction of the arrows;

Fig. 4 is a vertical section, taken upon the line 4—4 of Fig. 5, looking in the direction of the arrows;

Fig. 5 is a horizontal section, taken upon the line 5—5 of Fig. 4, looking downward in the direction of the arrows;

Fig. 6 is a vertical section, taken upon the line 6—6 of Fig. 8, looking in the direction of the arrows;

Fig. 7 is a vertical section, taken upon the line 7—7 of Fig. 6, looking in the direction of the arrows;

Fig. 8 is a vertical section, taken upon the line 8—8 of Fig. 6, looking in the direction of the arrows;

Fig. 9 is a vertical section, taken upon the line 9—9 of Fig. 6, looking in the direction of the arrows;

Fig. 14 is a vertical section, taken upon the line 14—14 of Fig. 1, looking in the direction of the arrows, a part of the collar being broken away for clearness;

Fig. 15 is a section, taken upon the line 15—15 of Fig. 14, looking in the direction of the arrows;

Fig. 16 is a vertical section, taken upon the line 16—16 of Fig. 17, looking in the direction of the arrows, the cover of the contact box being removed;

Fig. 17 is a section taken upon the line 17—17 of Fig. 5, looking in the direction of the arrows;

Fig. 18 is a view, corresponding to Fig. 8, of a modified form of a separator;

Fig. 19 is a section, taken upon the line 19—19 of Fig. 5, looking in the direction of the arrows;

Fig. 20 is a section, taken upon the line 20—20 of Fig. 19, looking in the direction of the arrows;

Fig. 21 is a section, taken upon the line 21—21 of Fig. 19, looking in the direction of the arrows;

Fig. 22 is an end view of the mechanism shown in Fig. 19, as viewed from the right-hand side;

Figure 13:
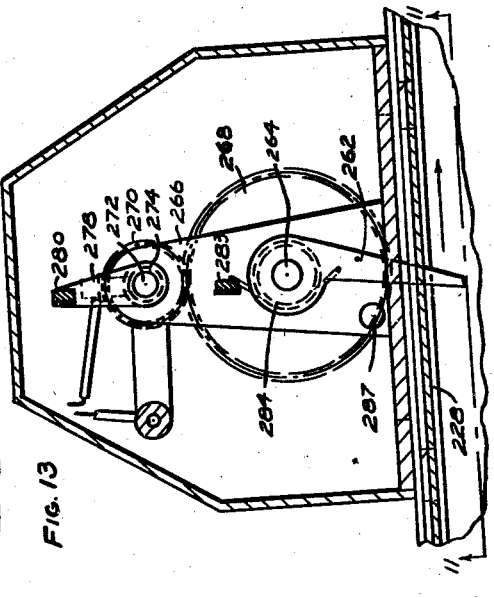
Fig. 13 is a similar section, looking toward the right.
Figure 36:
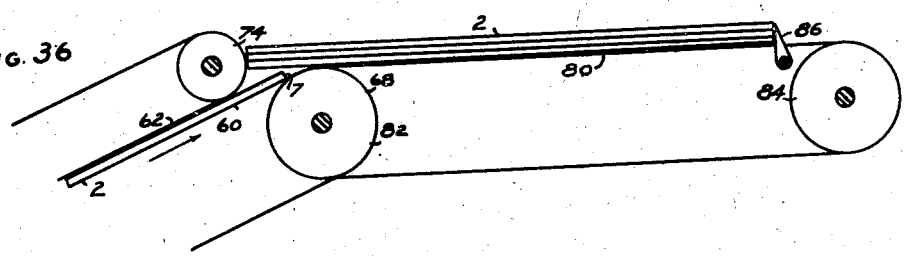
Figure 37:
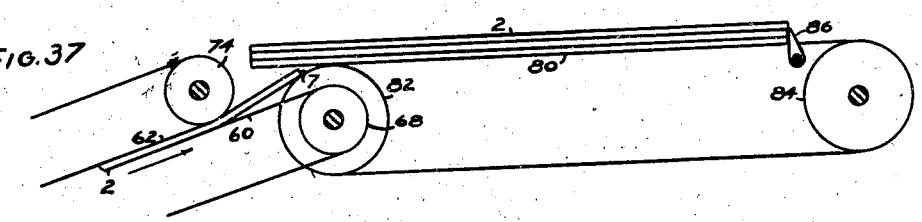
Figure 38:
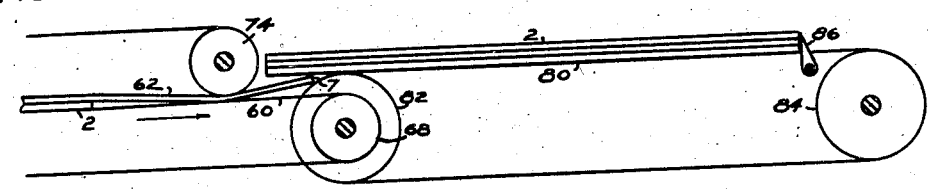
Figure 39:
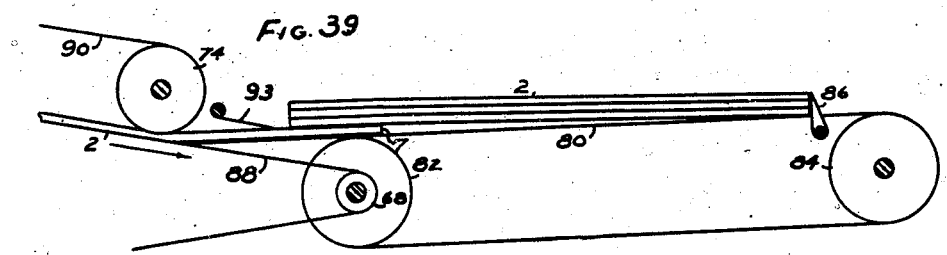
Figure 50:
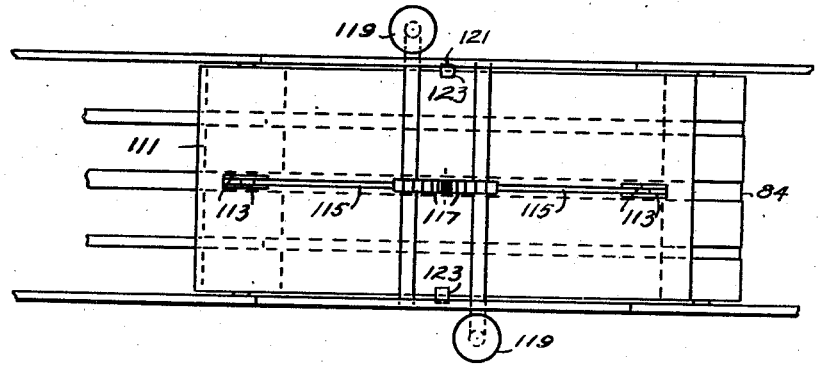
Figure 49:
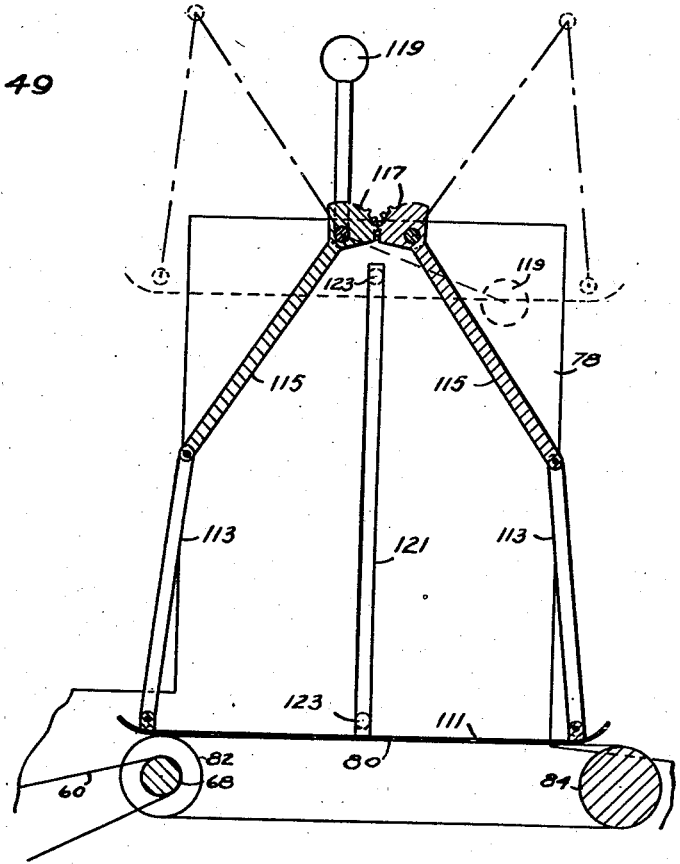
Figure 51:
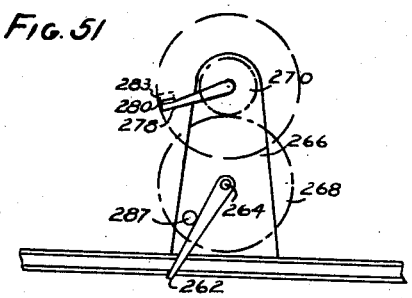
Figure 57:
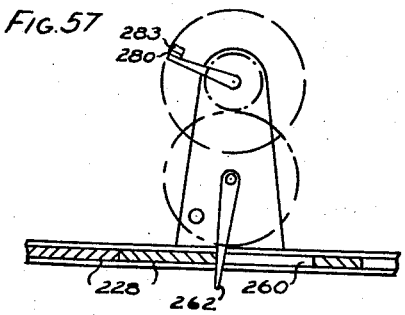
Figure 58:
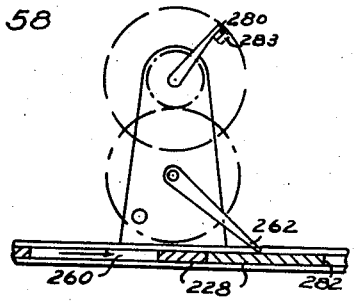
Figure 59:
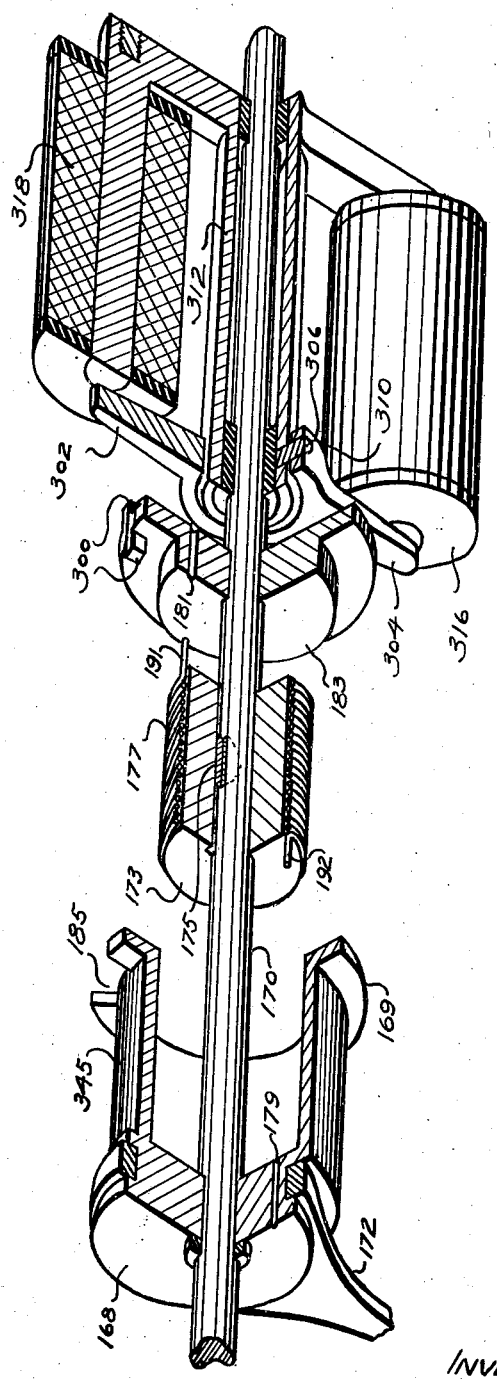

Figs. 23 and 24 are sections, taken upon the lines 23—23 and 24—24, respectively, of Fig. 25, looking in the direction of the arrows;

Fig. 25 is a plan view of the mechanism shown in Fig. 27;

Fig. 26 is a corresponding end view;

Fig. 27 is an elevation of the control drum shown in the control box of Fig. 1, partly in section and partly broken away;

Fig. 28 is a section, taken upon the line 28—28 of Figs. 3 and 29, looking in the direction of the arrows, the counting fingers being shown in end view, and resting against the supporting plate;

Fig. 29 is a section taken upon the line 29—29 of Fig. 28, looking in the direction of the arrows, the view being thus taken from the side, and as though the cover of the contact box were removed, the contact fingers being still shown resting against the supporting plate;

Figs. 30, 31, 32 and 33 are views corresponding to Fig. 29, showing the contact fingers in different positions;

Fig. 34 is a wiring diagram with the parts of the machine positioned in their approximate locations on the machine;

Fig. 35 is a corresponding, simplified wiring diagram;

Fig. 36 is a view, showing a modification of the stack-feeding mechanism shown in Fig. 2;

Fig. 37 is a corresponding view of the mechanism shown in Fig. 2;

Figs. 38 and 39 are further modifications;

Fig. 40 is a section of a modified magazine, the section being taken upon the line 40—40 of Fig. 41, looking in the direction of the arrows;

Fig. 41 is a section taken upon the line 41—41 of Fig. 40, looking in the direction of the arrows;

Fig. 42 is a view corresponding to Fig. 41, showing the magazine raised and turned a one-quarter revolution;

Fig. 43 is a view of a modified stack hold-down weight shown by full and dotted lines in two different positions;

Fig. 44 is a corresponding end view, looking from the right;

Fig. 45 is a view corresponding to Fig. 43, showing a modified stack hold-down weight;

Fig. 46 is a corresponding plan view;

Fig. 47 is a view, corresponding to Fig. 44, of a further modification;

Fig. 48 is a corresponding plan view;

Fig. 49 is a view, corresponding to Fig. 43, of still a further modification;

Fig. 50 is a corresponding view;

Fig. 51 is a diagrammatic view corresponding to Fig. 13, but upon a small scale;

Figs. 52 to 58, inclusive, are similar views, showing the parts in different positions; and Fig. 59 is an exploded perspective, upon a larger scale, of parts of the mechanism shown at the right of Fig. 6.

A plurality of newspapers 2 are shown in Fig. 2 in lapped relation, upon inclined conveyor belts 4 by which they are delivered into a hopper 6, where they become temporarily stacked. The right-hand ends (as shown in Fig. 2) of the inclined conveyor belts 4 may be disposed adjacent to a newspaper press (not shown), or a stack of newspapers (not shown), another conveyor (not shown), or any other source of supply of newspapers. Though the machine is shown in connection with newspapers, preferably fed with one of the folded edges 7 forward, it will be understood that other sheet material, such as magazines and other periodicals, may also be treated in this machine, or parts thereof; and the terms "newspaper", "sheet" and the like will, therefore, to avoid circumlocution of language, be often employed in the specification and the claims, in this generic sense, except where the context or the state of the art requires otherwise.

The left-hand end of the conveyor belts 4 are shown in Fig. 2 disposed at the right-hand end of the bottom of the hopper 6. As the first newspaper 2 is delivered by the conveyor belts 4 into the hopper 6, therefore, it is carried by horizontally disposed, continuously traveling belts 8, at the bottom of the hopper 6, forward, or toward the left, as viewed in Figs. 2 and 8. The second newspaper 2 is similarly carried forward, to the left, on top of the first newspaper 2. The third newspaper 2 is similarly carried forward, to the left, on top of the second newspaper, and so on.

The forward, or left-hand (as viewed in the said Figs. 2 and 8), ends of those newspapers 2 that are disposed above the lowermost newspaper or newspapers soon engage a vertically disposed, shield wall 10 that prevents their further progress. The newspapers 2 thus become accumulated in the hopper 6, each on top of its next-lower neighbor, in the form of a stack, the weight of which serves to press the lowermost newspaper 2 against the said horizontally disposed belts 8, at the bottom of the hopper 6.

It is desirable that the pressure of the newspapers against the conveyor belts 8 caused by their own weight be not too great; particularly as it is desired to lift this stack from time to time, as will be explained more fully hereinafter. To relieve the pressure, therefore, only part of the newspapers in the hopper 6, above a predetermined height, are permitted to exert their full weight upon the newspapers beneath. This result may be effected in any desired way. According to the illustrated embodiment, the left-hand end 12 (as viewed in Figs. 2 and 8) of a wall 14 is disposed near the upper end of the vertically disposed, shield wall 10, at a point a little higher than the lowest point of the inclined conveyor belts 4. The wall 14 is shown inclining toward the right, substantially parallel, and oppositely disposed, to the said inclined conveyor belts 4. Above the point 12, therefore, the newspapers will become collected in the hopper 6 in an inclined stack between the wall 14 of the hopper 6 and the inclined belts 4.

The lower terminal portion of the vertically disposed, shield wall 10 terminates in a finger 16, disposed very close to the horizontally disposed conveyor belts 8, but raised slightly thereabove, so as to provide a space through which the conveyor belts 8 may feed the lowermost newspaper 2 out of the hopper 6, into the space outside to the left of the hopper, as shown in Fig. 2. The finger 16 may be constituted of an integral portion of the vertically disposed shield wall 10, extending continuously downward, and bent or inclined smoothly forward in the direction of travel of the conveyor belts 8. The shield wall 10 is vertically adjustable to regulate the said space between the finger 16 and the belt 8. It is usually preferred to have only one newspaper at a time pass under the extremity 18 of the finger 16. To effect this result, the space near the belt conveyor 8, under the extremity 18 of the finger 16, should be adjusted so as to be less than the thickness of two newspapers, so that the second newspaper from the bottom shall be caught by the sloping, inner wall of the inclined finger 16, as illustrated more particularly in Fig. 2. If desired, of course, the position of the finger 16 may be adjusted high enough so as to permit more than one paper to pass its extremity 18, as illustrated in Fig. 18, particularly where it is desired to feed the papers overlapped, as illustrated in Figs. 30 to 32. The belts 8 and the projecting finger 16 of the shield 10, or either of them, are sufficiently flexible to accommodate themselves to the papers 2 as these papers are carried between them. The flexing of the belts 8 under the finger 16 is illustrated in Fig. 18.

The adjustability of the finger 16 to control the separate feeding of the papers passing thereunder, or their number so passing, may be effected in any desired manner. As illustrated more particularly in Figs. 2, 6, 8 and 18, the preferred mechanism for adjusting the position of the finger 16 comprises two eccentrics 20 disposed between two pairs of lugs 22 and 24 that extend horizontally out from the vertically disposed, shield wall 10, at the extreme ends thereof, though they may extend throughout the length of the shield. The eccentrics 20 are pivoted about a shaft 25 to which is fastened an adjusting handle 26 that is positioned outside the side frame 165 of the machine. By turning the handle 26, therefore, about the axis of the shaft 25, the eccentrics 20 will be caused to turn, engaging the lugs 22 and 24, and thus raising and lowering the vertically disposed shield wall 10 and the finger 16 at its lower end. The shield wall 10 will be guided in such vertical movement by ways 29 in the side frames 165 and 167 of the machine. The eccentric 20 may be maintained in adjusted position by means of a spring-presed pin 28 on the handle 26, that may be caused to enter any of a plurality of index openings 30 (Figs. 1 and 8) disposed for different settings of the shield 10, along a circular arc about the axis of the shaft 25. The shield 10 need not, of course, be a continuous wall; it may be replaced by suitably arranged fingers or guides.

The newspaper or newspapers are passed out of the hopper 6, under the finger 16, by the same conveyor belts 8 before described; and to this end, they extend forward, to the left of the vertically disposed shield wall 10, a considerable distance beyond the confines of the hopper 6. Because of the higher coefficient of friction between newspaper stock and the material of which the belts 8 are constituted, than between the newspapers 2 themselves, the belts have no difficulty in moving the lowest paper 2 in the hopper 6 out from under the others. The belts pass over pulleys 32 and 34, the former adjacent to the lower end of the inclined conveyor belts 4, at the right-hand end of the hopper 6, and the latter far to the left of the hopper 6. They pass also over an idler roll 33, shown just to the right of the shield 10. The number of belts 8 passing over the pulleys 32 and 34 is shown in Fig. 3 as four, with spaces between them through which are visible the hereinafter mentioned table supports 146. The right-hand pulley 32 is provided with a plurality of projections 35 for agitating the rear ends of the papers 2 in the hopper 6, as it revolves, thus eliminating the tendency of the papers 2 sticking together in the hopper 6, and also tending to drive the lowest paper 2 to the left, toward the shield 10. The agitator 35 need not, however, be attached to one of the conveyor pulleys, since it may be separately driven.

If more than one paper (or the desired other number of papers) should tend to feed past the shield 10, they will become separated by a separating roll 38 under which the belts 8 pass at an intermediate point, a little to the left of the finger 16. This is effected by flexibly pressing the separating roll 38 against the belts 8 and an idler roll 36 under the belts 8. The advancing, forward end of each newspaper, just after the paper travels out of the hopper 6, is thus pressed between the spring-pressed roll 38 and the roll 36 and the belts 8, and the newspaper continues to be so engaged as it continues its forward travel, to the left. The sheets thus travel between the conveyor 8 and the roll 36 below and the roll 38 above, as they leave the hopper. By operating the separating roll 38 in the same direction as the direction of travel of the belts 8, but at a surface speed lower than the speed of travel of the feed belts 8, and by suitably adjusting the pressure of its spring 40, the papers will become slowed down and dragged back, effecting their separation, and ensuring that the front edge of any particular paper 2 shall be behind the front edge of the next preceding paper 2 a sufficient distance to permit separate counting of the papers by a counting finger 44 or counting fingers 44 and 46, as hereinafter explained. They may be entirely separated from each other, with a space 42 between each two newspapers 2, as illustrated in Fig. 2, or they may become overlapped, as illustrated in Figs. 30 to 32, depending upon the adjustment and the drive.

If the papers 2 were all of equal thickness, and if there were no irregularities or other sources of like error, and particularly if the papers 2 were not overlapped, one counting finger 44 would ordinarily suffice. In the illustrated machine, the counting fingers 44 and 46 are not laterally separated, in a direction at right angles to the line of feed, but are substantially exactly alined with each other in the line of feed, between two adjacent belts 8.

If the shield 10 itself operates effectively to separate the papers 2, the roll 38 may either run idly, or it may be driven at the same speed as the feed belts 8. In that event, as the sheets at the bottom of the hopper 6 are separated from the stack and carried by the conveyor belts 8 through the space under the inclined finger 16 of the shield 10, the roll 38 will merely hold the paper 2 under it against the belts 8 and the roll 36 to insure its being drawn out. A deflector or guide plate (not shown) may be used to prevent the upper sheets, if overlapped, from becoming lifted by the roll 38.

When the newspapers 2 have an extraordinary tendency to stick together, as when under the influence of static electricity, they may be separated by the use of horizontally disposed belts 48, mounted over pulleys 50 and 52, and disposed in contact with the belts 8, as shown in Fig. 18, or a series of rolls may be employed. The pulleys 50 and 52 are mounted upon horizontally disposed arms 54 that are intermediately supported at 56 by a supporting member 176. The pulley 50 occupies the position occupied by the roll 38, as previously described, directly over the roll 36, and the pulley 52 is disposed to the left thereof, as viewed in Figs. 2 and 18. One of the pulleys 50 and 52 may be positively actuated so as to cause the lower level of the belts 48 to travel to the left, in the same direction, indicated by the arrow, as the direction of travel of the belts 8, though not necessarily at the same speed.

After the papers have thus been caused to travel from the conveyor belts 4 into the hopper 6, and from the hopper 6 between the rolls 36 and 38, they are next counted. To this end, the counting finger 44 is illustrated in Fig. 2, above the left-hand portion of the belts 8, and to the left of the roll 38. As the newspaper 2 advances from between the rolls 36 and 38 in Fig. 2, its forward, folded edge 7 engages this counting finger 44. As soon as the paper has traveled beyond the position occupied by the counting finger 44, this finger falls into the space 42 between the successive papers 2. Each raising and lowering of the counting finger 44 will result in registering a count, as will be hereinafter explained, to indicate that another newspaper 2 has been conveyed by the conveyor belts 8 from the hopper 6 to outside the hopper. A similar operation takes place when the sheets traveling under the counting finger 44 are overlapped, as before described; though there is no space 42 into which the counting finger 44 may drop, there is a difference in height between different parts of the overlapped papers that produces the same raising and lowering of the counting finger 44. The additional counting finger 46, spaced from the counting finger 44 in the line of feed, may, however, be employed, particularly with overlapped newspapers, the operation of one counting finger following upon the operation of the other. When the additional counting finger 46 is employed, it operates, like the counting finger 44, to engage the sheets that travel under it; but the count is registered in response to the differential, up-and-down movement of both counting fingers 44 and 46 together, and not in response to the movement of one counting finger only, as will hereinafter be explained, thus effecting a more accurate control of the counter mechanism.

The belt conveyor 8, the shield wall 10, the separating member 38 or 48, and the counting fingers 44 and 46, are disposed at the bottom of the machine, the newspapers 2 traveling therethrough from right to left, as viewed in Fig. 2. The papers 2 are then transferred to the upper portion of the machine by means of vertically disposed, continuously traveling, lift, conveyor belts 60 and 62. The conveyors 8 and 60 may, of course, be in the form of a single conveyor. After the papers 2 have thus been raised by the belts 60 and 62, they are again carried through the machine, but from left to right. This enables lapped papers to be in the correct position to be stacked from beneath. The forward edges 7 of the newspapers are practically parallel at all times, the papers 2 being fed quite regularly in this machine.

The conveyors belts 60 pass over two large pulleys 64 and 66 and a smaller pulley 68. The pulley 66 is disposed vertically above the pulley 64. The conveyor belts 62 pass over three pulleys 70, 72 and 74. The lower surface of the pulley 64 is disposed substantially on the same level as the upper reach of the conveyor belts 8, and the pulley 70 is disposed below and to one side of the pulley 64. The newspapers 2 thus travel horizontally into the bite between the conveyor belts 60 and 62, and are turned upward, around the large pulley 64, toward the pulleys 66 and 72. The pulleys 68 and 74, however, are situated to the right of, and above, the pulleys 66 and 72, the pulley 74 being disposed a little to the left of the pulley 68. The upper portions of the belt conveyors 60 and 62, therefore, are disposed below, and at an upward incline to, the bottom of a magazine 78, so as to convey the newspapers successively to the right, after they leave the pulley 66, at an upward incline, toward the pulleys 68 and 74.

Horizontally disposed, continuously traveling, conveyor stacker belts 80 at the bottom of the magazine 78 pass over horizontally alined pulleys 82 and 84 at the bottom of the magazine 78. The pulley 82 is disposed on the same shaft as, so as to be coaxial with, the pulley 68, under the magazine 78. It is not essential that the belts 8 or 80 be horizontal,—they may be inclined under the hopper 6 or the magazine 78 at an angle.

The papers are thus carried toward a predetermined point of the bottom of the magazine 78, just above the pulley 82, and under the bent portions 92 at the left of a hold-down weight 76, or under the rearward projecting ends of the newspapers 2 in the magazine 78, as illustrated in Figs. 2 and 36 to 39.

The function of the weight 76 is to press the lowest paper 2 against the conveyor belts 80. This function is not needed in the hopper 6, because of the weight of the papers 2 that are fed in from above the stack. In the magazine 78, however, the papers are fed in by the conveyors 60 and 62 from below.

As the first paper 2 is delivered by the conveyor belts 60 and 62, between the pulleys 74 and 82, it travels at the said upward incline, above the said pulleys 68 and 82, the pulley 82 thus serving as a guide roll.

The front edge 7 of the first newspaper 2 is first gripped between the body portion of the hold-down weight 76, at the point where it joins the bent portion 92, and the portions of the belts 80 immediately beneath. The said front edge 7 is then dragged in by the conveyor belts 80, under the said bent end 92 of the hold-down weight 76. The pulley 84 is disposed beyond the magazine 78, to the right thereof, as viewed in Fig. 2, so that the belt conveyor 80 would carry the papers in the magazine 78 beyond, and to the right of, the magazine 78, on to a table 140, were it not for stops 86 that project upward between the stacker belts 80 to engage the forward end of the lower paper or papers 2 in the magazine 78 and limit its or their further progress. The stops 86 need not project very high, since it is quite sufficient to restrain the travel of only the bottom paper 2 in the magazine 78.

As the newspapers 2 continue to be successively advanced by the belt conveyors 60 and 62, the forward end 7 of each next-following newspaper, as it leaves between the pulleys 74 and 82, enters into the magazine 78 at a point between the pulley 82 and under the rear end of the newspaper already at the bottom of this magazine 78, overhanging, or projecting rearwardly over, the pulley 82, providing a small space for the entering paper 2 to pass between the bottom of the stack of papers and the upper reach of the belts 80.

After the first newspaper 2 has been fed into the magazine 78, it will itself serve as such guide for the next-following newspaper, provided that the distance of the stop 86 from the uppermost point of the pulley 82, at the receiving end of the conveyor 78, is less than the length of the newspapers. It need not, however, be a great deal less. The remaining papers in the magazine, above the bottom paper 2, will remain in the magazine, because they are protected from the feeding action of the belts 80 by the lowermost paper in the stack, which is alone in contact with the belts 80, and they are held in the magazine 78 by the holddown weight 76.

This travel of the newspapers into the bottom of the magazine, under the stack of papers therein, so that the newspapers are stacked in the magazine 78 from underneath, is illustrated upon a larger scale in Fig. 37 where, as in Fig. 2, the pulley 82 is shown as of larger diameter than the diameter of the pulley 68. The forward end of each newspaper is thus caused to bend upwardly away from the conveyor belts 60, and to ride up on the large-diameter pulley 82, into contact with the lower face of the bottom newspaper in the magazine 78, after which it is fed into the magazine 78 at the bottom thereof.

The newspapers 2 are thus fed into the magazine 78 by the combined movements of the lift belts 60 and 62 and the stacker belts 80. The bends in the newspapers during such feeding are influenced by both these sets of belts. It is possible to control the bends, therefore, by different arrangements of the belts. For example, the pulley 82 may be of substantially the same diameter as the pulley 68, as illustrated in Fig. 36. The pulley 74 of the upper feed belt is arranged so that it tends to lift the rear edges of the bottom paper in the stack, getting it out of the path of the following paper 2. The feed belts are inclined upward, as in Figs. 2 and 37, but the clearance, in the latter case, between the rear edge of the paper at the bottom of the stack and the front edge of the entering paper, is obtained by having a larger pulley 82 for the stacking belts 80, on the same shaft with the pulley 68 of the lower lift belt 60. In that event, the forward end of the newspaper leaving the pulleys 68 and 74 would travel into the bottom of the magazine 78 without such violent bending of the paper as is illustrated in Figs. 2 and 37. It is also possible to arrange the upper portions of the conveyor belts 60 and 62, instead of at an upward incline, in substantially the same horizontal plane as the horizontal plane of the belts 88, as illustrated in Fig. 38, which will produce less total bending of the newspapers during their entry into the magazine than is the case with the constructions illustrated in Figs. 2, 36 and 37. In the constructions illustrated in Fig. 38, as in that of Figs. 2, 36 and 37, the paper 2 entering the magazine 78 must take two bends: one, under the upper lift belt pulley 74, and another over the left stacking-belt pulley 82. In the case of Figs. 2, 36 and 37, the bends are unequal in degree, that around the stacking-belt pulley 82 being the greater; while in the case of Fig. 38, the bends are equal.

As shown in Fig. 39, furthermore, the newspapers may leave the belt conveyors 60 and 62 at a downward incline, instead of, as in Figs. 2, 36 and 37, at an upward incline. The upper portions of the conveyors 88 and 90, corresponding to the upper portions of the conveyors 60 and 62 of Figs. 2, 36 and 37, will then be disposed above the bottom of the magazine, and will incline downward toward the bottom of the magazine, so as to convey the papers 2 successively to the said point, near the upper portion of the pulley 82, at the said downward incline. This construction is illustrated also in Fig. 41. In this case, the paper is required to take only one bend, as in the case of Fig. 36, but securing clearance, as in the two cases illustrated in Figs. 2, 36 and 37 and 38. As the belts 88 and 90 are inclined downwards, the front edge of the entering paper is deflected downward, with the aid of a flexible guide 93, between the pulley 74 and the bottom of the magazine 78, to prevent the papers bending or crumpling upward in the space between the pulley 74 and the magazine 78. When the entering paper 2 strikes the stack pulley 82, it is lifted and drawn under the stack, causing the paper to bend under the upper lift-belt pulley 74.

The belt conveyors 60 and 62 or 88 and 90 may be modified by raising the central belts of one of them, and correspondingly lowering the central belts of the other, with respect to the side belts. The papers 2 will then be fed into the magazine 78 concaved or convexed and, therefore, stiffer than when fed into the magazine flat. Such stiffness will prevent all possibility of the unrestrained sections of the papers buckling in the space between the guide roll 82 and the bent portions 92 of the hold-down weight 74 or the rearwardly projecting, tail ends of the sheets in the magazine. The convexity or the concavity need extend only part way under the stack at this joint.

It is desirable to have the horizontally disposed conveyor belts 8 travel at a higher speed than the inclined conveyor belts 4, but at a slower speed than that of the lift belts 60 and 62 which, in turn, should travel more slowly than the stacker belts 80. The papers 2 will then separate out more rapidly in the hopper 6, and congestion and buckling of the papers 2, that might be caused by slippage between the belts and the papers 2, is avoided. Such slippage is particularly possible in the magazine 78, caused by the drag of the upper papers 2 therein on the lowermost paper 2 as it is fed into the magazine 78. The desired relative speeds may be produced in any desired manner, such as is illustrated in Fig. 1. The conveyor belts 4 are continuously driven by a belt 61 passing over a pulley 57 and the pulley 63 of a motor 65 that is supported in a cradle 59. Another belt 67 passes over the pulley 63, the pulley 69 on the shaft of the pulleys 68 and 82, the pulley 77 on the shaft of the pulley 64, the pulleys 51 and 53 on the shaft of the pulleys 34 and 70, respectively, and a pulley 71 mounted upon a shaft 73, so as continuously to drive the other conveyor belts. As shown in Figs. 1 and 2, the pulleys 32, 66, 72, 74 and 84 are idler pulleys. The desired speeds of the various conveyors may be attained by suitably proportioning the driven pulleys. A sprocket chain 75 for driving the roll 38 is also illustrated in Fig. 1, as well as in Fig. 3, driven from the shaft 77 of the pulley 64. The sprocket chain 75 is mounted over a sprocket 81 mounted at one end of the shaft 178 on which the roll 38 is mounted. There is further illustrated in Fig. 1 a sprocket chain 87 that is driven from the shaft 73 and that passes over suitable sprockets, loosely mounted on each of a number of shafts for actuating them at suitable intervals when the sprockets become clutched to their respective shafts. There is a shaft 133 for actuating a wrapper-feeding roll 132, a shaft 233 upon which is mounted a cutter roll 138 for severing the wrapper, a shaft 333 for actuating a cam 254 for printing the wrapper prior to its feeding, and a shaft 386 for controlling an address slide 232. The sprocket chain 87 is shown passing also over an adjustable tensioning sprocket 83.

The newspapers 2 thus become stacked on the conveyor 80, and the stack in the magazine 78 thus rises higher and higher as the newspapers 2 are thus successively conveyed to the bottom of the magazine and successively fed thereinto, until the desired number of newspapers, as determined by the count of the counting finger 44 or the counting fingers 44 and 46, has been collected in the magazine 78. The weight 76 rises higher and higher during this accumulation of the papers in the magazine 78, so as always to press down upon the top newspaper in the magazine, thus to press the bottom newspaper in the magazine against the conveyor belts 80 during its feeding into the magazine.

To permit such raising of the weight 76, it is shown, in Figs. 2 and 43, as constituted of one or more flat bars, having the integral, angularly bent portion 92 at the left, pivoted at 94 to the lower end of a link 96, the upper end of which is pivoted to the frame of the machine at 98, above and to the left of the newspaper stack in the magazine 78. In the lowermost position of the weight 76, the link 96 engages a stop 100 to limit the degree of movement of the link 96 and, therefore, the weight 76, to the left. The weight 76 is thus prevented from swinging to the left, out of the magazine 78, when it drops to the bottom of the magazine after the stack of newspapers therein has been delivered on to the delivery table 140. In this position, the bent portion 92 serves as a guide for guiding the first newspaper 2, as it is received from the conveyors 60 and 62, in under the hold-down weight 76 and above the conveyor 80. As the stack of papers 2 in the magazine rises, the weight 76 also rises and, at the same time, moves to the right, as illustrated by dotted lines in Fig. 43, actuating the link 96 also to the right, away from the stop 100. The link joint enables the hold-down weight 76 to lie flat on the top paper 2 of the stack no matter what the height of the stack.

A modified hold-down weight is illustrated in Figs. 45 and 46, constituted of one or more flat bars 102, connected with a vertical, centrally disposed, bar 104, restricted to move vertically only in a guide or guides 106, from the lowermost, or full-line position of Fig. 45 to the dotted-line position thereof. The guide or guides 106 are shown as a hole in a cross piece 107 disposed at the top of the magazine 78. The ends of the cross piece 107 are provided with pins 109 that slide in vertically disposed slots 116 in the side walls of the magazine 78, thus preventing the weights 102 from turning about the central bar 104. This hold-down weight 102 has the advantage over the hold-down weight 76 in that it remains centrally positioned over the stack of newspapers 2 in the magazine 78, irrespective of the height of the stack.

Still another modified hold-down weight is illustrated in Figs. 47 and 48, comprising one or more flat bars 108 connected to a frame member or carriage 110, having upwardly extending, vertically disposed arms 112, each provided with a pair of guide or anti-friction wheels 114, adapted to move vertically in the vertically disposed guide grooves 116 in the side walls of the magazine 78. The wheels 114 produce less friction than the pins 109 of Figs. 45 and 46. This hold-down weight has the same advantage as the hold-down weight 102, and is more positive in action.

Each bar of the hold-down weight 102 has an integral, upwardly bent portion 148, corresponding to the upwardly bent portions 92 of the bars of the hold-down weight 76, for guiding the first newspaper 2, from between the conveyors 60 and 62, in between the hold-down weight 102 and the conveyor 80. A similar, upwardly bent portion 148 is provided on each bar of the hold-down weight 108.

The hold-down weight mechanism 111 of Figs. 49 and 50 is connected, at its front and rear ends, to one end of links 113, the other ends of which are connected to arms 115 that are geared together at 117. Each arm 117 is provided with a counterweight 119, that reduces the pressure on the topmost paper in the stack of papers 2 in the magazine 78 as the height of the stack increases. This results in uniform pressure between the stack 2 and the belts 80 and enables the stack of papers 2 to be released easily for delivery to the table 140. The hold-down weight mechanism 111 is provided with guide pins 123 that fit into vertically disposed slots 121 in the sides of the magazine 78 to maintain the weights 111 horizontal. This function is aided by the gear segments 117. The topmost position of the weights 111 is indicated by dotted lines in Fig. 49.

It may be desirable to stack the newspapers 2 so that each group of twenty-five or fifty, or any other desired number of papers, shall have the folded edges reversed; that is, so that the top twenty five papers, for example, in a stack shall have their end and side folded edges facing north and east, respectively, and the next twenty five papers shall have those edges facing south and west, the next twenty five, north and east again, etc. Alternating the papers in this manner is desirable for some purposes; for example, to facilitate their being counted by the persons receiving them, and also to make a more stable stack. This may be effected, according to the present invention, as illustrated in Figs. 40 to 42. Since, as before stated, the papers feed from the hopper 6 with a folded end 7 leading, they naturally enter the magazine 78 in the same way. When twenty five papers, as an illustration, have been so fed, the feed is stopped, and a crankshaft 404 is turned one revolution. The turning mechanism may be similar to the mechanism, hereinafter described, on the knife and wrapper feeds. In the course of this revolution, the crank pin 406 first raises one end of a lift link 408 through a yoke 410 and a thrust collar 412. This raises, through a splined, vertical shaft 413, a frame or table 414 that normally rests below the stacking belts 80 but that, on being lifted, lifts with it the papers 2 in the magazine 402 off the belts 80. When the papers are thus clear of the belt, a Maltese cross 416 is engaged by its complementary member 411 on the crankshaft 404, and turned through a quarter revolution. By means of a pair of miter gears 418 and 420, the former of which is splined on the vertical shaft 413, this quarter revolution is transformed into a half revolution of the frame 414 holding the papers. The sides of the magazine 402 are attached to the frame 414 and turn with it. At the completion of the half revolution, the lift link 408 returns the frame 414 beneath the level of the stacking belts 80, so that the papers once more rest on these belts;

this time, however, in the reversed position. The feed is then recommenced, and the stack is again rotated a half revolution after the feeding of twenty five papers more; and so on. To insure that the papers, when returning to the belts 80, after the half revolution, shall be disposed in back of the stops 86, the center line of the vertical shaft 413 is located so that it intersects the papers somewhat to the left of their center, as viewed in Fig. 41. To permit the frame 414 to be turned from the bottom, the stacking belts 80 should be composed of two smaller sets of belts, one on each side of the vertical shaft 413, as is clearly shown more particularly in Figs. 41 and 42.

In whatever manner the newspapers 2 are stacked in the magazine 78, the stack must later be removed and placed on to a wrapper. It is now in order, therefore, to describe the wrapper-feeding, addressing and severing mechanism.

The wrapping paper is fed intermittently from a roll or reel of wrapping paper 118 that is mounted to turn upon a spindle or rod 120, disposed at the left-hand side of the machine, and a little below the magazine 78, as illustrated more particularly in Figs. 2 and 4. From the roll 118, the wrapping-paper web 122 rises substantially vertically to a guide roll 124, over which it passes to the right, over a platen 126 and under the backing plate 128 of the addressing mechanism. As will be explained hereinafter, the platen 126 is intermittently moved upward to force the interposed wrapping-paper web 122 against a type-backed ribbon 130 between the web 122 and an address plate 228. Different address plates 228 will thus produce different addresses and other insignia upon the web 122.

At a suitable moment, the portion of the web 122 thus addressed is fed forward, to the right, between lower and upper fed rolls 132 and 134, the former of which is larger than the latter, and may be constituted of rubber, while the latter may be constituted of metal. One revolution of the lower fed roll 132 about its shaft 133 results in feeding the required length of wrapper from the reel 118. Such revolution of the feed roll 132 will be produced after a predetermined degree of rotation of the shaft 386, as will be explained later. The web 122 is fed over a cutter bed 136, under the cutter roll 138; and, through guides 135 and 137 (see particularly Figs. 2 and 4), over to the stacker belts 80, which grip the web under the hold-down weight 76 and carry it forward to the right, stretching it taut. At the completion of the revolution of the feed roll 132, the cutter roll 138 is actuated, in synchronism with the other movements of the machine parts, to make one revolution, thereby severing the addressed portion of the web 122 from the remainder of the web. The severed portion of the web constitutes a wrapper; in the industry, it is often called a "snipe." The wrapper, thus severed, is thereupon pulled into the magazine 78 by the belts 80, into engagement with the stops 86, and remains there until the first newspaper 2 enters the magazine 78 under the wrapper. The next-following newspapers are then fed in under this first newspaper as before described, the wrapper remaining always at the top of the stack, under the hold-down weight 76. The name, address and other information relating to the dealer for whom the stack of newspapers 2 in the magazine 78 is about to be collected have previously been printed, as before described, on the upper side of the wrapper.

If desired, a secondary wrapper, perhaps of old newspaper, may be placed on the table 140 before the stack is released from the magazine, in order to cover the portions of the stack not covered by the printed wrapper. The stack, with the printed wrapper thereon, would then be delivered on to the secondary wrapper on the table 140, in the manner presently to be described. The secondary wrapper may be deposited on the table 140 by some other mechanism than the belts 80, and this may be effected from a point in front or back of the table 140, instead of from the left thereof, as viewed in Fig. 2. Such modified arrangement may have preferences in cases where the sizes of the stacks intended for different dealers vary so greatly that different-length wrappers are desirable, in order that the wrappers may go completely around the sides and the top of the stack of newspapers. The illustrated embodiment of the invention provides but a single-size wrapper, but it may be desirable to have an intercoordination between the size of the stack and the length of wrapper feed desired. The table 140 is provided with a vertically disposed stop wall 142 for limiting the forward movement of the newspapers.

After a predetermined number of newspapers 2 have been accumulated in the magazine 78, as determined by the counting finger 44, or the counting fingers 44 and 46, further feeding of the newspapers into the magazine 78 will automatically be stopped, as hereinafter described. The stops 86 will thereupon be freed, whereupon the conveyor 80 will carry the stack of newspapers accumulated in the magazine 78, as a unit, out of the magazine 78 and on to the table 140, or the said secondary or other wrapper resting thereon. The hold-down weight 76, of course, then falls by gravity once more to the bottom of the magazine 78.

The mechanism for freeing the stops 86 is illustrated more particularly in Figs. 14, 15 and 34. These stops are rigidly attached to a rock shaft 189 upon which is mounted a catch 141 that is normally retained in a recess 143 of an armature 145 of an electromagnet 147, by a spring 139 that normally maintains the armature 145 raised, but it may be released, in opposition to the action of the spring 139, by thus energizing the electromagnet 147. The catch 141 normally, therefore, maintains the rock shaft in such position that the stops 86 occupy their effective positions, illustrated by full lines in Fig. 15; but the catch 141 becomes released when the armature 145 is attracted downward by the electromagnet 147. The belts 80 are then free to move the stacked papers 2 in the magazine 78 on to the receiving table 140, and the thrust of the stack of newspapers 2 on the moving belts 80 will then actuate the stops 86 from the full-line, to the dotted-line, position of Fig. 15, in opposition to the force exerted by a counterweight 157. The counterweight 157 later returns the stops 86 to their normal positions, illustrated in full lines. In order to absorb the shocks of the moving papers that strike the stops 86, as they are fed into the magazine 78, at high speed, the mounting of the catch 141 on the rock shaft 149 is rendered yielding or resilient, through the medium of a resilient insert 153, interposed between the shaft 189 and a collar 151 that surrounds the shaft 189. The electromagnet is energized by the closing of a brush contact member 365 and a contact member 368 of a multiple-switch master controller 149, as hereinafter explained.

During the travel of the wrapper through the magazine 78, of course, there should be no further delivery of newspapers to the conveyor belts 80.

So long as the conveyor belts 8 continue to engage the lowermost newspaper in the hopper 6, the belts 60 and 62 will continue to deliver newspapers to the magazine 78. Provision is, therefore, made for lifting the stack of newspapers in the hopper 6 up, out of contact with the belts 8, in synchronism with the movements of the other parts of the machine, when it is desired to stop the further feed of the newspapers 2.

To this end, a plurality of bar supports 146, rigidly connected together upon a common frame, are normally disposed below, and between, the belts 8, as shown more particularly in Figs. 2, 3 and 18. In such normal disposition of the supports 146, they are ineffective, and do not interfere with the feeding of the newspapers 2 out of the hopper 6 by the belts 8. The supports 146 may, however, become raised, as a unit, up between the belts 8, into an effective position, as shown in Figs. 6 and 8, thus performing a double function: first, they lift the newspapers 2 up above the belts, where they constitute a table for supporting the newspapers, so that the belts can not, further, convey the newspapers out of the hopper; and secondly, they close up the space under the finger 16, so that the newspapers could not any longer be fed under the finger 16, even if the belts could, otherwise, be capable of doing so.

This raising of the table supports 146 is automatically effected, immediately after every feeding of the desired, predetermined number of papers 2 out of the hopper 6, by means of long, parallelly disposed, side rods 186. The separating roll 38 (or the belts 48, Fig. 18) is raised simultaneously with the raising of the table 146, as is also illustrated in Fig. 8, to reduce the friction upon any newspaper 2 that may happen to become clamped, part way out of the hopper 6, between the table 146 and the finger 16 at the bottom of the shield 10, thus to prevent damaging the clamped newspapers.

The cycle of operations is controlled by the counting finger or fingers. The more complicated, but more effective, operation, involving the use of both contact fingers 44 and 46, will be described herein, and from such description persons skilled in the art will have no difficulty understanding the corresponding operation when but a single contact finger 44 is employed.

Referring more particularly to Figs. 2, 3 and 28 to 33, the contact fingers 44 and 46 are adapted normally to rest upon a supporting plate 152. They are, however, respectively pivoted about pivots 154 and 156 that extend through the side frame 167 and into a contact box 160 that is adapted to be closed by a cover 162. Though two pivots 154 and 156 are illustrated, the counting fingers 44 and 46 may be pivoted about a common axis (not shown) by which the counting fingers may be carried. Inside the contact box 160, the pivots 154 and 156 are provided with contact arms 164 and 166 that are adapted to become engaged and disengaged as the counting fingers are pivotally moved up or down in different directions. The contact members may control a relay for a counter magnet, as will be hereinafter explained, but the operation of the counting fingers 44 and 46 may be recorded also in other ways, as by means of a beam of light, operating on a photo-electric cell (not shown).

According to the preferred embodiment of the invention, the contact members 164 and 166 are normally open, in the normal position of the counting fingers 44 and 46, as illustrated in Fig. 29. As a newspaper 2 travels from right to left, its forward, folded end 7 first engages the counting finger 44, thus pivotally actuating it about the pivot 156 toward the left and raising it above the plate 152, upon which it and the finger 46 normally rest, from the position illustrated in Fig. 29 to that shown in Fig. 30. The normal angle between the counting fingers becomes changed and the contact arm 166 is, therefore, also actuated to the left; with the result that it makes contact against the contact member 164 to close the circuit of the counter magnet 202. Because of the engagement of the contact members 164 and 166, furthermore, the counting finger 46 is likewise raised slightly away from the supporting plate 152, about its pivot 154, as is also illustrated in Fig. 30, though such raising is of no functional importance. If the contact members 164 and 166 are adjusted so as to make contact for a somewhat thinner paper 2 than the thinnest that is required to be counted, the contact members 164 and 166 will not skip any counts. This may readily be effected by adjustably turning the contact arms 164 and 166 about their respective pivots 154 and 156, and fixing them in adjusted position in any desired way, as by means of set screws (not shown).

As the newspaper 2 continues its travel toward the left, as viewed in Figs. 2 and 28 to 33, its forward, folded end 7 engages, the next moment, the counting finger 46, raising it pivotally about the pivot 154 from the position illustrated in Fig. 30 to that illustrated in Fig. 31. The angle between the counting fingers becomes thus changed again, and the contact between the contact members 164 and 166 becomes thus broken again. The contact members 164 and 166, therefore, become disengaged when the counting fingers 44 and 46 both rest on the supporting plate 152 (Fig. 29) or when they both rest on the same newspaper 2 (Fig. 31); and they engage, to close the circuit, when the right-hand counting finger 44 is alone engaged by the newspaper 2 (Fig. 30).

When the rear end of the paper 2 rides further forward, away from the contact finger 44, so that the latter drops off the rear edge of the paper 2, into the space 42 between successive papers 2, the contact members 164 and 166 remain disengaged, as illustrated in Fig. 33; and they remain still disengaged when the paper 2 travels still further forward, away from under the counting finger 46, which latter then also falls into the said space 42, as illustrated in Fig. 29. The contact members 164 and 166 thus effect the closing of the circuit only once corresponding to each newspaper 2 that travels under the counting fingers 44 and 46, when these newspapers travel singly, separated by the space 42. The same result takes place when the newspapers travel overlapped.

To return to the position illustrated by Fig. 31, with both counting fingers 44 and 46 resting on the forward, or lower, newspaper 2, the forward end 7 of the overlapping, or rear newspaper 2 will engage the counting finger 44 and cause it to ride up thereon, off the previous newspaper in the line of feed, in the same way as discussed in connection with Fig. 30. The contact members 164 and 166 will, therefore, again become engaged, the contact member 166 becoming moved from the position of Fig. 31 to that of Fig. 32 to effect such engagement. The disengagement of the contact members 164 and 166 will be effected, in the same way as before described, when the overlapping paper 2 travels further forward to the left, to engage and raise the contact finger 46. In the case of overlapping newspapers, too, therefore, there will be one closing of the circuit by the contact members 44 and 46 corresponding to each newspaper 2 that passes under the counting fingers 44 and 46.

Not only should the free ends of the counting fingers 44 and 46 be disposed at spaced points in the line of travel of the newspapers, but the forward edges of two adjacently disposed, overlapping papers should be spaced a greater distance than the distance between the extremities of the counting fingers 44 and 46; otherwise, the forward end of the overlapping newspaper would raise the counting finger 46 before the contact arm 166 would have had an opportunity to engage the contact arm 164, and contact between the contact arms 164 and 166 would then be prevented.

One function of the plate 152 is to prevent sagging of the belts 8 that travel over the plate 152 and under the counting fingers 44 and 46. It serves also as a stop for the counting fingers, to prevent the contact arms 164 and 166 from making unnecessary, or accidental contact. This last-named result may, of course, be brought about in other ways, as by positioning suitable stops (not shown) in the contact box 160.

The movement of the contact fingers 44 and 46 and the closing of the contact arms 164 and 166 controlled thereby serve to close an electric circuit for actuating a counter. Each time that the circuit is closed, the counter is actuated to register a count. The counting fingers 44 and 46 are thus pivotally moved, in succession, by the newspapers 2, to control the actuation of the contact members 164 and 166 with respect to each other in opposite directions, thus to control, in turn, the actuation of the counter.

The contact members 164 and 166 are connected to the outside circuit through metal springs 194 and 196, respectively, which also serve to hold the counting fingers 46 and 44, respectively, in their lowest positions. The spring 194 is fastened at one end 197 to the contact arm 164 and at its other end by means of a holding member 199, to the inside of the contact box 160, as shown more particularly in Fig. 29. One end of the spring 196 is similarly fastened at 201 to the contact arm 166, and its other end is similarly fastened to the inside of the contact box 160 by a holding member 203.

Figure 12:
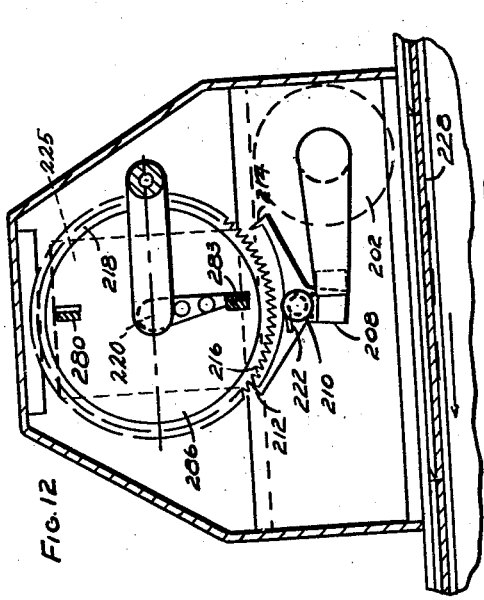
Fig. 12 is a section, taken upon the line 12—12 of Fig. 10, looking toward the left.
Figure 10:
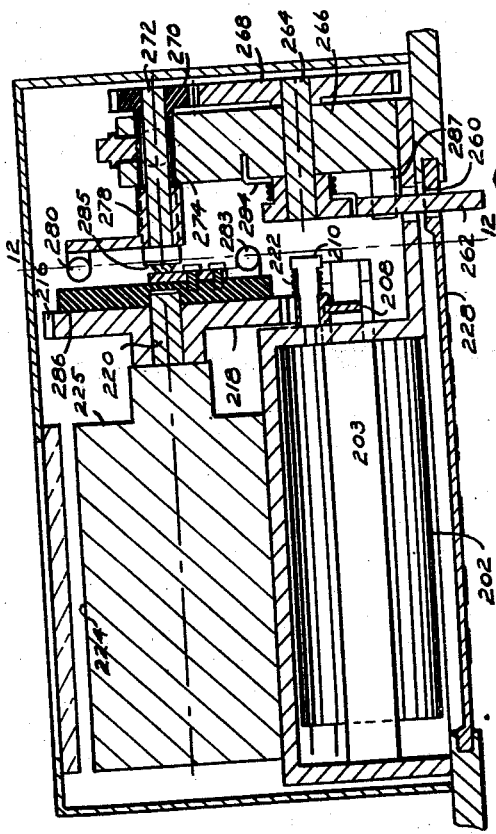
Fig. 10 is a vertical section, taken upon the line 10—10 of Fig. 11, looking in the direction of the arrows.

The circuit connections will be understood from the circuit diagram of Fig. 34 taken in conjunction with the apparatus illustrated more particularly in Figs. 10 and 12. The contact member 164 is connected by way of the spring 194 and a conductor 200 to one side of the coil of the counter magnet 202, and the contact member 166 is similarly connected by way of the spring 196 and a conductor 204, by way of other connections that will be described hereinafter, to the other side of the counter-magnet coil 202. The magnet coil 202 is mounted upon a magnet core 203, between the north and south poles of which a pawl 208 is intermediately pivoted, at 210. The pawl 208 is provided at its ends, on opposite sides of its pivot 210, with two pawl teeth 212 and 214 for engaging the slightly offset ratchet teeth 216 of a ratchet counter wheel 218 that is mounted upon a counter shaft 220. The counter wheel 218 is fixed to the shaft 220 of any suitable, dial-operating mechanism 225, so that the successive movements of the counter 218, tooth by tooth, are registered on a dial 224, as shown more particularly in Fig. 5, which registers the total count.

The tooth 212 is held normally in engagement with a ratchet tooth 216 of the counter wheel 218 by a spring 222 mounted about the pivot 210. It is adapted to be rocked, in one direction, out of contact therewith, in opposition to the action of the spring 222, by the magnetic field of the coil 202. The tooth 214 will, at the same time, become moved into engagement with another tooth 216 of the counter 218. Upon the opening of the circuit of the coil 202, the spring 222 will rock the pawl 208 in the opposite direction, to cause the tooth 214 to disengage the ratchet wheel, and the tooth 212 to reengage the ratchet wheel. The pawl 208 thus moves like an ordinary escapement, the teeth 212 and 214 engaging the teeth 216 of the ratchet 218 alternately to effect step-by-step movement of the ratchet wheel 218.

At each closing of the contact members 164 and 166, in response to the actuation of the counting fingers 44 and 46, therefore, the counter 218 will be actuated to the extent of one of the teeth 216, to register an additional count; and the spring 220 will return the tooth 212 into engagement with the teeth 216 at each opening movement of the contact members 164 and 166.

A counter of this description is operable at extremely high speeds.

It is necessary, however, to do more than merely count the sheets. As before stated, it is desired to count them up to a predetermined number, which number is different for each individual newsdealer, and then to wrap the predetermined number so counted. This feature will be explained more fully hereinafter.

It is at the end of the counting of the predetermined number of newspapers in the magazine 78 that the stops 86 are released, the stack of sheets in the magazine 78 is delivered on to the delivery table 140, and the table 146 becomes raised.

One of the side members 186, that raises the table 146 to stop the feed of the papers 2 out of the hopper 6, is provided with a projection 350, shown more particularly in Figs. 3, 26, 27 and 34, that is adapted to engage a plunger 352 to raise it. The plunger 352 depends through an opening 351 in the lower wall 355 of the commutator box 353 (Fig. 1) and is secured to the underside of two insulating, contact-engaging members 357 and 359, that are secured together at different levels. The contact-engaging member 357 engages under a contact member 356 and the contact-engaging member 359 engages under a contact member 362. The contact members 356 and 362 are disposed at correspondingly different levels, as illustrated in Figs. 23 to 27. The raising of the plunger 352, therefore, will effect the raising of the two contact members 356 and 362. A contact member 358 is normally out of contact with the contact member 356 and a contact member 360 normally engages the contact member 362. The raising of the projection 352, therefore, results in the opening of the contact members 360 and 362, and the closing of the contact members 356 and 358. The opening of the contact members 360 and 362 effects the breaking of the circuit just previously closed to effect the raising of the table 146. The closing of the contact members 356 and 358 effects the closing of the circuit of a commutator-drive motor 364. The electrical connections are shown diagrammatically in Fig. 34. Suitable speed reducers keep down the speed of the shaft of the motor 364 to a desired, low speed.

As soon as the table 146 becomes thus raised, therefore, the motor 364 is operated throughout a complete revolution to control the rotation of a multiple-switch master controller 149. The master controller, in turn, effects a sequence of operations, as follows: First, it releases the stops 86 to permit feeding the papers 2 stacked in the magazine 78 on to the delivery table 140, as just described. Secondly, it actuates the feed rolls 132 and 134, thus effecting the advance of the wrapping-paper web 122 into the bottom of the magazine 78, through the guides 135 and 137. Thirdly, it advances an address slide 232 into position, to advance an address plate 228 under the address mechanism 230. Fourthly, a platen-lever 243 is then actuated about its intermediate pivot 250 to move the bed 126 against the backing plate 128, thus to print the address and other insignia on the next-succeeding portion of the wrapper web, under the address plate 228 already advanced in position, as previously described. Fifthly, it actuates the cutter knife 138 to sever the wrapper from the web 122, to enable the conveyor 80 to feed the wrapper into the magazine 78. Sixthly, and finally, it returns the table 146 from its effective position, illustrated in Fig. 8, to its ineffective position, illustrated in Figs. 2, 3 and 18, whereupon the feeding of the papers 2 out of the hopper 6 recommences. Thereupon, the motor 364 is stopped by the breaking of its circuit through separation of the contact members 356 and 358, and the machine is ready for another cycle of operations. It will be understood, however, that this sequence of events controlled by the master switch 149 may be varied to some degree; for example, the address plate may be fed forward after the wrapper is cut. This might, however, result in some loss of time, since the address plate, in order to control the quantity, must be in position under the selector.

These operations are effected, in succession, upon the closing of the motor circuit, by a brush contact member 365 that is carried at the free end of a plate spring 366 that is attached to the motor shaft, through an insulating collar 367, and that is adapted to make contact successively, during its cycle of revolution, with contact members 368, 370, 372, 374, 376 and 378. These contacts are made and broken almost instantaneously, in order to effect the above-described sequence of operations rapidly. Each of these operations is brought about by the said contact members successively closing and opening the circuits of actuating magnets.

The operation of raising and lowering the table 146 will be described first, to complete the description above.

When the brush contact member 365 engages the contact member 378, a circuit is established, by way of a conductor 392, to the magnet coil 318, which effects the lowering of the table 146. After the side members 186 of the table frame 146 drop, thus again opening the circuit of the commutator motor 364, the motor stops running, but not until after a predetermined time interval, for the motor 364 has sufficient momentum so that it is carried away from the last-named commutating point, where it engages the contact member 378, to its ineffective position, between the contact members 378 and 368, before coming to rest.

The raising of the table 146 is effected by means of an eccentric 168 that is rotatably mounted upon a shaft 170 that is journaled in the front and rear frame plates 165 and 167, and that is constantly rotated, at constant speed, from the shaft 77, by means of a sprocket chain 79 mounted over a sprocket 171 at one end of the shaft 170 (Fig. 6). The only part, in addition to the sprocket 171, that is positively connected with the shaft 170 is a drum 173 that is locked thereto by a Woodruff key 175. The drum 173, therefore, is constantly rotated with the shaft 170.

An eccentric strap 172, that is mounted over the eccentric 168, is integral with a depending hollow, connecting rod 174, in which is mounted a stem or plunger 176, to the lower projecting end of which the separating roll 38 is pivoted. The spring 40, before referred to, is mounted in the hollow of the rod 174, in coiled form, about the upper end of the stem 176. The connecting rod 174 is thus extensible against the spring-loaded plunger 176, to compensate for the different positions to which the frame 146 is free to rise, against various thicknesses of paper and against different settings of the shield 10. The roll 38 is shown in Fig. 6 as in the form of two rolls, mounted to turn about a spindle or rod 178 that extends through vertically elongated openings 180 and 182 in the front and rear walls 167 and 165 of the machine frame. The spindle 178 is rotatably mounted in a bearing 184 at the lower end of the stem 176, as shown more particularly in Figs. 6 and 8. When the roll or rolls 38 are raised, as before described, this is effected by raising the spindle 178 in the openings 180 and 182.

The side rods 186 are provided with bent, forward ends (shown by dotted lines in Fig. 8) that are pivoted at the ends of the spindle 178, outside the front and rear plates 165 and 167 of the machine, and the rear ends of the rods 186 are pivoted at 188, under the conveyor 4, as is more particularly illustrated in Figs. 1, 2, 3 and 6. The side rods 186 are thus adapted to rock up and down slightly about the pivot 188. The table supports 146 are secured to cross bars 269 that transversely connect the side rods 186, through openings 187 and 190 in the side plates 165 and 167 of the machine frames, by means of screws 271 that enter the cross bars 269 through underhanging flanges 273 of the table supports 146. The openings 187 and 190 permit the cross members 269 to become raised and lowered. The table supports 146 are thus carried by the side rods 186 and are raised and lowered as the side rods 186 are rocked up and down about the pivots 188.

A half-revolution of the eccentric 168, from the position illustrated in Fig. 2 to that illustrated in Fig. 8, will result in raising the roll 38, as before described, and a further half-revolution of the eccentric 168 will restore the roll 38 to the position shown in Fig. 2. Such movement of the roll 38, and the spindle 178 upon which it is mounted, will effect the raising or lowering of the table 146, by means of the side rods 186.

A coiled spring 177 is wound around the outside of the drum 173. One end 192 of the spring 177 is held in a hole 179 in the eccentric 168, and the other end 191 in a hole 181 of a disc 183 that is free to turn on the shaft 170, as is illustrated more particularly in Figs. 6 and 59. Near the circumference, a lug 300 extends through both faces of the disc 183. The right-hand end of the lug 300 is adapted to be engaged either by an upper armature 302 or a lower armature 304, the former cooperating with an upper magnet coil 318 and the latter with a lower magnet coil 316. If the lug 300 is not held by either armature, the spring 177 will engage and wind itself tight on the constantly rotating drum 173, so as to become tensioned thereagainst. The friction of the spring 177 against the drum 173 will thus effect the rotation of the spring 177, the disc 183 and the eccentric 168, until the lug 300 comes into contact with one or the other armature 302 or 304. Restraining the disc 183 will, therefore, effect unwinding of the spring 177 from the drum 173 and interrupt the rotary movement of the spring 177, the disc 183 and the eccentric 168. The eccentric is thus intermittently clutched to the constantly rotating shaft 170, so as intermittently to be actuated thereby, to effect intermittent actuation of the table 146, up and down, in its two positions.

In Figs. 6 and 7, it is the upper armature 302 that is shown engaging the lug 300, the lower armature 304 having been pulled to the magnet 316. The armatures 302 and 304 are carried on the upper and lower ends of a yoke 306 that is pivoted to move to the right and to the left, as viewed in Fig. 6, about pivots 308 and 310 that enter suitable journals in the central common core 312 of the magnets 316 and 318.

As before stated, the upper ends of the side members 186 are rockingly mounted about the spindle 178. The half-revolution of the eccentric 168, which effects the lowering of the table 146, is brought about through the closing of contact members 366 and 378. The one-half revolution which raises the table 146 is brought about by the contact members 280 and 283 in the selector coming together, or throwing an emergency switch 294.

Contact members 280 and 283 in the selector will close the circuit of the lower magnet coil 316. The contact member 283 is shown in Fig. 24 connected by conductors 398 and 399 with one end of the coil 316; and the contact member 280 by a conductor 320 and other connections, as will be hereinafter explained, to the other end of the coil 316. The closing of this circuit will cause this lower coil 316 to attract the lower armature 304, as illustrated in Figs. 6, 27 and 59, thus causing the lug 300 to become engaged by the upper armature 302.

As the drum 173 rotates with the shaft 170 to which it is keyed, the spring 177 tends to drag the eccentric 168 with it, and will do so as long as the disc end 191 of the spring 177 is not restrained. If, however, the disc end 191 is held, in response to the lug 300 engaging one of the armatures 302 and 304, the rotating movement of the drum 173 will tend to unwind the spring 177, until it leaves the drum 173, releasing the tension of the spring 177 on the drum 173, and the latter alone will then rotate, without the spring 177. This stops the movement of the eccentric 168, as well as of the spring 177. This stopping of the disc end 191 of the spring is accomplished by pulling one of the armatures 302 and 304 against its corresponding electromagnet 318 or 316. The first-named armature thereupon releases the lug 300, so that the other end comes into the path of the lug 300 on one side of the disc 183. When the other electromagnet is energized, the other armature is pulled over, releasing the disc 183 and allowing the spring 177 to tighten on the drum 173, and thus rotate the eccentric with it, until the lug 300 strikes the other armature, half a revolution beyond. Energizing the lower magnet 316 thus raises the connecting rod 174, and energizing the upper magnet 318 lowers it.

To control the amount of unwinding of the spring 177, so that the eccentric 168 shall stop at the same point each time, the portion of the lug 300 on the left-hand side of the disc 183 engages the end wall of a slot 185 cut in the flange 169 of a cylindrical barrel 345 which is part of the eccentric, and which also serves as a case for the spring 177, as illustrated more particularly in Figs. 6 and 59.

The lug 300 may thus be held by either armature 302 or 304. If it is held by the upper armature 302, the eccentric 168 will be stopped in its upper position. If it is held by the lower armature 304, the eccentric 168 will be stopped in its lower position. The low position of the eccentric 168, as already explained, corresponds to the low position of the table 146, permitting the conveyor 8 to feed the papers 2 out of the hopper 6. The high position of the eccentric 168, as has also been explained, corresponds to the high position of the table 146, in which the papers 2 can not be fed out of the hopper 6.

It has already been explained that the circuit of the magnet coil 316 is controlled by the contact members 280 and 283. The circuit of the magnet coil 318 is controlled by the contact members 365 and 378 of the contact switch 149 or by the emergency switch 294.

When the contact member 365 makes contact with the contact member 368, as previously described, a circuit is established, by way of a conductor 380, to the electromagnet 147 that controls the catch 141 for releasing the stops 86 (see particularly Figs. 14, 15 and 34) thus to release the stack of papers in the magazine 78, after which the wrapper is fed into the magazine 78. After the stack of newspapers in the magazine 78 has, in consequence, been delivered to the delivery table 140, as already explained, the next operation controlled by the commutator 149 is to advance the address plate or stencil 228, and to feed the wrapper web 122 into the magazine 78. This plate 228 is provided with means for determining beforehand the correct number of newspapers that shall be stacked in the magazine 78 for the particular dealer corresponding to that particular address plate. The addressing is accomplished when the brush contact member 365 moves from the contact member 368 to the contact member 370.

The circuit of an electromagnet 384 is next closed, when the brush contact member 365 engages the contact member 372, by way of a conductor 382. The electromagnet 384 is illustrated more particularly in Figs. 1, 2 and 4 as operating a shaft 386, supported in a member 258, through a single revolution to permit a spring 246 to effect the actuation of a link 244 and, therefore, a cycle of movement of an address slide 232. The link 244 is actuated by a crank 328 on the shaft 386. The slide 232 is returned by a spring-loaded arm 238.

To the right of the counter, as viewed in Figs. 2 and 4, and to the left of the magazine 78, there is shown a vertically-disposed container 226 for a large number of plates 228, one corresponding to each newsdealer to whom the newspapers stacked in the magazine 78 are to be shipped.

In Figs. 2 and 4, the slide 232 is shown under the container 226, so that the lowermost plate 228 in the container rests thereon. In Fig. 16, the same slide 232 is shown moved away from beneath the container 226, so as to permit the lowermost plate 228 to drop into a position from which the slide 232 may actuate it under the address mechanism. The plates 228 are successively moved to the left, from underneath the addressing device 128, to a position underneath the counter and selector, at the same time that the lowermost plate 228 in the container 226 is moved under the addressing device 128, shown between the counter and the container 226. The plate 228 previously under the addressing device 128 is moved into the selector to control the counting off of the proper number of papers to be fed under the wrapper now in position in the magazine 78. After it has been used, the plate 228 is moved into the container 261, under a spring-pressed finger 263. The plates 228 are later removed from the container 261 for new use.

Figure 11:
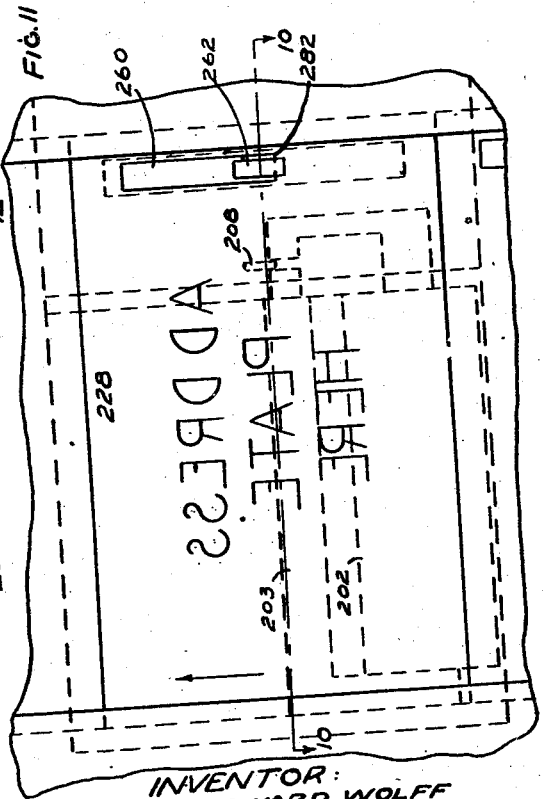
Fig. 11 is a horizontal section, underneath the mechanism, taken upon the line 11—11 of Fig. 13, looking upward in the direction of the arrows.

Each address plate 228 has an opening 260 (Figs. 10 and 11) through which, at the suitable time, a selector arm 262 extends. The openings 260 are of different length in different address plates 228, and it is the lengths of these openings that determine the number of papers 2 that will be stacked in the magazine 78. By means of this slot-type selector, therefore, the number of papers that shall be delivered to the magazine 78 is determined automatically by the length of the openings 260 on the address plate 228. The length of the opening 260, as will hereinafter appear, determines the arcuate distance between two contact members 280 and 283. This arcuate distance is adjusted in accordance with different-sized openings 260, so that the contact member 283 will be actuated by the counter through different arcuate distances to stop the feeding of the papers 2 in the magazine 78 after different predetermined numbers of papers have been stacked therein. As the address plate 228 is moved into position from left to right, as viewed in Fig. 13, therefore, the wall 282 of the slot 260 will bear against the lower portion of the selector arm 262, forcing it to pivot to the right, about the axis of the shaft 264, thus causing turning of the gears 268 and 270, with consequent arcuate movement of the contact member 280, to the initial position determined by the length of the opening or slot 260.

The rocking shaft 264 to which the selector arm 262 is fixed extends through a bearing 266, as shown more particularly in Fig. 10. On the other side of the bearing 266, the shaft 264 carries the gear 268 that meshes with the gear 270. The purpose of the gears 268 and 270 is to amplify the range of possible count. The gear 270 is mounted upon a shaft 272 that extends through a bearing 274; and, on the other side of the bearing 274, it is provided with an arm 278, carrying the contact member 280. The contact member 280 is thus traced through an arc by the gears 268 and 270. The lower end of the selector arm 262 rides on the upper surface of the address plate 228, as it is moved into position in the selector. At the same time, the contact member 280 is carried through the said arc into engagement with the contact member 283, which is disposed in fixed relation to an insulating friction disc 286. The disc 286 is rotatably mounted upon the shaft 220, but is frictionally clutched against the counting ratchet wheel 218 by a flexible spring 285.

Figure 52:
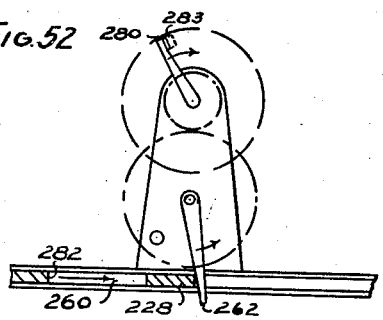

As the contact member 280 is thus turned through the said arc, therefore, it pushes the counting-wheel contact member 283 ahead of it, through the same arc, against the friction of the disc clutch on the counting wheel 218, from the position of Fig. 52 to that of Fig. 58; and, later, that of Fig. 53. It is assumed that, in Fig. 52, the parts are in the position occupied at the moment when the plate 228 enters the selector, Fig. 51 representing the position of the parts when the machine is first commenced operating. The spring 285 serves also to connect the contact member 283 into circuit. The circuit connects with the other contact member 280 through the journal of its shaft 272, the arm that carries it being conducting. A stop 287 is provided to keep the selecting arm 262 from coming back beyond a limiting point when no plate 228 is in place. The arm 262 comes to rest against the stop 287 in such a position that the plate 228, which enters, will engage the arm 262 and make the selection.

The two contact members 280 and 283 are thus moved to the same initial position by every plate 282, since the selecting-arm contact member 280 is positively driven by the selecting arm 262 through the gears 268 and 270.

Figure 53:
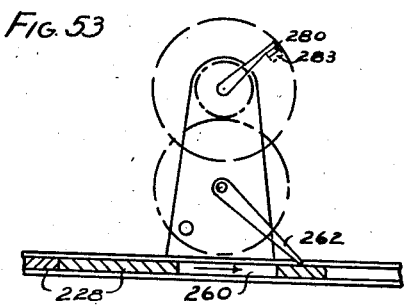
Figure 54:
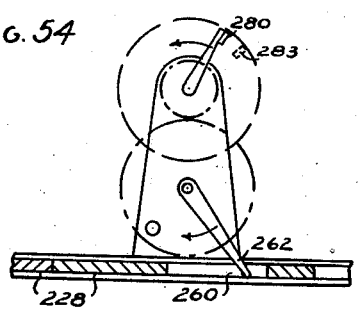
Figure 55:
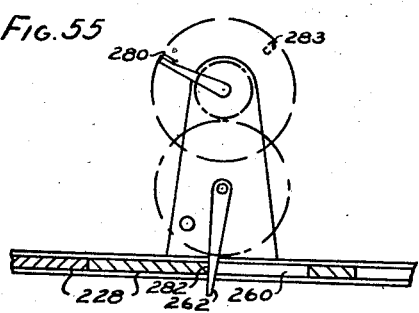

When the former plate 228 has been almost finally moved out of position, into the container 261, under the spring-pressed finger 263, and the new address plate 228 is almost at its correct position in the selector, the selecting arm 262 will be actuated into the slot or opening 260 in the plate 228, from the position of Fig. 53 to that of Fig. 54. This may be effected by a spiral spring 284, coiled about the shaft 264 on the left-hand side of the bearing 266, as viewed in Fig. 10. The spring will exert a clockwise torque on the shaft 264 and the arm 262 mounted thereon, as viewed in Fig. 13. The contact member 280, therefore, will again move away from the contact member 283. As before stated, the length of the arc through which the contact members 280 and 283 will thus become separated will depend upon the position of the wall 282 in the slot 260 of the new address plate 228. The selector arm 262 will come to rest, under the action of the spring 284, against the rear edge 282 of this slot, as illustrated in Fig. 55. In dropping into this slot, the selecting-arm contact member 280 is moved back, away from the counting-wheel contact member 283, through a definite arc, this arc being determined by the length of the slot or opening 260, as before stated. The longer the slot 260, the greater the arc through which the selecting-arm contact member 280 moves back from the counting-wheel contact member 283. Whether more or less papers 2 will be fed into the magazine 78 corresponding to any particular address plate 228, thus depends upon the position of the wall 282 on that address plate. The cycle of previous events above described, prior to the advance of the new plate 228, had left these contact members 280 and 283 apart, and the completion of the cycle brings them together again.

Figure 56:
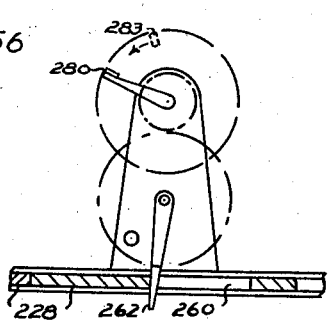

As the papers 2 start feeding to the magazine 78, and close and open the circuit to the electromagnet 202 at the counter, by means of the contact members 164 and 166, the counting wheel 218 is driven by the pawl 208, which moves one tooth for each paper in such a direction that the contact member 283, which is driven, step by step, by the counting wheel 218, through the friction disc 286, moves back toward the selecting-arm contact member 280. The greater the length of the slot 260 in the plate, the greater the arc through which the contact member 283 will travel before it engages the contact member 280; and hence, the greater the number of papers entering the magazine 78 before these contact members 280 and 283 come together and close the circuit to the mechanism which stops the feeding of additional papers. It is when these contact members 280 and 283 finally make contact, as illustrated in Figs. 56 and 57, that a circuit will be closed for effecting the raising of the table 146.

At a later time, as the plate 228 is expelled into the container 261, to make way for the next plate 228, the arm 262 will ride over the wall 282 all the way on to the upper surface of the plate 228, as it is expelled, so as to leave the slot 260.

The number of oscillatory movements of the pawl 208, with its teeth 212, 214, necessary to effect engagement of the contact members 280 and 283 will, therefore, depend solely on the length of the openings 260 in the various address plates 228; and this, in turn, will determine the number of papers 2 stacked in the magazine 78 by stopping the feed of the papers out of the hopper 6, through the raising of the table 146.

An additional selector arm (not shown) may be provided which, in cooperation with the selector arm 262, will increase the number of papers that may be counted in the magazine 78. An additional opening (not shown) would correspondingly be provided, similar to the slot 260, for receiving such additional selector arm. One of the slots, in cooperation with its selector arm, would then count units, and the other tens. The number of selector arms and cooperating slots may further be increased to count hundreds, thousands, and so on. Further modifications may involve the use of lugs or pivoted arms, in place of slots, for adjustment purposes. One such modification is disclosed in a copending application, Serial No. 104,628, filed October 8, 1936. A dial, or a plate with a lug, may be employed, adjustable by turning the dial or moving the lug.

It is now in order to describe the mechanism for actuating the address plates 228. The slide 232 is provided with an upward projection 234 having an anti-friction roll 236 that may be engaged by an arm 238. The arms 238 and 240 are pivoted about a pivotal shaft 242. The arm 238 is positively actuated about the pivot 242 by means of the connecting rod 244, through mechanisms hereinafter described. The arm 240 is maintained in engagement with the anti-friction roll 236, during such actuation of the arm 238, by the spring 246, one end of which is fastened to the arm 240 and the other end to a cross brace of the machine 237. During this positive actuation of the arm 238 by the connecting rod 244, it will positively move the slide 232 away from under the container 226 to the right, as viewed in Figs. 2 and 4, and to the left as viewed in Fig. 16. This spring 246 serves to return the slide 232 from the position of Fig. 16 to the position of Figs. 2 and 4, by the arm 240 engaging the anti-friction roll 236.

It is preferred thus to spring-load the arm 240 against the positively driven arm 238, as it releases the pressure of the arm 238 upon the anti-friction roll 236, and thus prevent possible destruction of the plates 228 or parts of the machine, in the event that there should be an obstruction to the smooth passage of the plates during the actuation of the slide 232 from the position of Fig. 16 to the position of Figs. 2 and 4. If a jam occurs during the feeding of the address plates 228, the spring-loaded arm 240, together with the slide 232 controlled thereby, will, because of the unusual resistance, stop short midway in its passage, tensioned by the spring 246, and the crank-driven arm 238 will continue throughout its cycle of movement, until it reaches the end of its stroke, thus preventing such damaging of the plates, or of the machine. If this occurs, the resultant change in angle between the two arms 238 and 240 will result in moving a contact arm 241, that is attached to the spring-loaded-arm shaft 242, over a commutating disc 245 carried by the positively driven shaft 238, thus closing a circuit of the warning alarm lamp 390, thus to warn the operator that the machine is out of order. Brushes 247 and 249 (Fig. 17) in the cover 251 of the contact box are connected by conductors 432 and 434 to the outside source of power 430 (Fig. 34). The brushes 247 and 249 are spring-pressed into contact with the arm 241 and with the sector 239, respectively, by coil springs in small cylindrical containers 255 and 257. The brushes 247 and 249 contact with the contact members 241 and 245.

An adjustable stop or stops 248 limits the return movement of the slide 232 by engaging the outside of the right-hand wall of the container 226, as viewed in Figs. 2, 4 and 5. By means of this stop or stops 248, the plates 228 will be caused to stop in the same position in the selector each time, thus preventing any discrepancy in the count.

The above operations have taken place in response to the brush contact member 365 engaging the contact member 372. When it becomes moved into contact with the contact member 374, a circuit becomes established, by way of a conductor 297 (Fig. 34), for printing the next portion of the wrapper web; and when it becomes moved into contact with the contact member 376, a circuit will be established, by way of a conductor 296, for operating the cutter 138.

The plate 228 having now been advanced under the addressing mechanism, it is ready to be used for the purpose of printing the address on the wrapping paper web 122 by actuating the platen 126 upward against the interposed wrapping-paper web 122. This printing may be effected at any time after the web 122 and the plate 228 have been moved into position and stopped. The platen 126 is at the left-hand end (as viewed in Fig. 4) of the intermediately pivoted platen lever 243, the right-hand end 252 of which is adapted to be actuated by a cam 254. When the riser on the cam 254, which is actuated by the shaft 333 prior to feeding, engages the right-hand end 252 of the lever 243, the platen 126 lifts the wrapping-paper web 122 against the type-backed ribbon 130, the ribbon 130 being forced against an address plate 228 backed by the plate 128. A spring 256 returns the plate 126 to its illustrated position.

The cutter comprises a cylinder, longitudinally cut away at 322, and its periphery is provided with sharp-pointed grooves 324, forming teeth that aline with similarly spaced serrations 326 in the fixed cutter bar 136. Two grooves 328 and 330 at the ends of the cutter 138 are not cut away, and these are always in engagement with serrations in the bar 136. This serves to keep the other teeth in proper alinement with their respective grooves when they are not engaged. By making these end grooves 328 and 330 in the rotating member less deep than the others, a certain clearance can be maintained between these other grooves and the bar serrations, so that there is no metallic contact between them, thus reducing the wearing of the teeth. Full end grooves are indicated in Fig. 19 by dotted lines.

Since the engaging points are arranged at an angle to each other, the cutting action will be progressive across the knife, reducing the driving load. The paper passes under the cut-out section 322 of the rotating cutter 138 until the proper length is fed out. The knife then begins to rotate. The sharp points on both edges of the cutters 136 and 138 cut into the paper and rip the paper apart between these points, leaving a serrated edge. The knife continues to rotate, pushing the cut-off section along, until it is drawn off by the belts 80. The mechanism for driving the rotating cutter 138, as illustrated more particularly in Fig. 19, is similar to that for driving the wrapper feed roll 132, the printing plate and the address-plate feed, and that for lifting and lowering the table 146. It differs from the last-named in several particulars, including the fact that there is but one electromagnet 332, and the movement is through a full revolution, rather than a half-revolution, of the floating ring. The position of the armature 334 also differs, engaging a lug 336 on the periphery of the floating ring 340. A slot 342 in one end of the cylindrical case 344 controls the amount of unwind by engaging the lug 336.

The sprocket chain 87 (Fig. 1) drives continuously a sprocket 335 that is loosely mounted on the cutter shaft 233. When the circuit of the electromagnetic coil 332 becomes closed by the commutator 149, the armature 334 becomes attracted by the core 337 of the coil 332 against the force of a flat spring 339 (see Figs. 19 and 34). Further operation is the same as described above in connection with the magnets 316 and 318 and their armatures 302 and 304, illustrated more particularly in Figs. 6 to 9 and 59. The case 344 of Fig. 19 corresponds to the cylindrical barrel 345 of Figs. 6 and 59; the disc 340 to the disc 183; and the spring 347 to the spring 177. Again, the magnets 290 and 291, respectively, that control the feed of the wrapper and the printer, serve the same purpose, to their parts, as the magnet 332 serves to the cutter. As similar mechanisms each controlled by one or two electromagnets and cooperating armatures control the shafts 133, 333 and 386, it will be unnecessary to describe in detail these other mechanisms also, as none of the others is any more complicated, and the operation of the other mechanisms will be understood from the above description of this one mechanism, illustrated more particularly in Figs. 6 to 8 and 59.

The mechanism for operating the feed roll 132, for example, is very similar to that described above in connection with Figs. 6 to 8 and 59. The coil 290 (Figs. 1 and 34), which corresponds to the coil 318, is wound about a core which corresponds to the core 312, which is held fixed by screws to the side plate 165 of the frame of the machine. An armature, pivoted to this core, carries a catch adapted to engage a stop of a collar in a casing in which is disposed a drum similar to the drum 173; and coiled thereabout is a spring corresponding to the spring 177. An end plate of the casing corresponds to the elements 183 and 345. The drum and a sprocket integral therewith are mounted upon a portion of the feed shaft 133 extending beyond the feed roll 132.

It is now in order to describe the wiring diagram of Fig. 34. A main switch 293 controls the circuit between the source of current 430 and the machine. A fuse 292 is inserted outside of the main switch.

A source 430 of non-pulsating, direct current is preferred for operating the various electromagnets, particularly the counter. If an alternating-current source is available, instead, a rectifier 379 may be provided, and a filter may be employed to smooth out the ripples.

Current to the main motor 65, the master-switch motor 364, and the warning-lamp circuit, however, is taken directly from the line by way of conductors 436, 438, conductors 440, 442, and conductors 432, 434, respectively.

Assuming that the rods 186 and the attached table 146 are raised, and that the said main or master brush contact member 365 occupies a position between the commutating points 368 and 378 at the time that the switch 293 is closed, the circuit to the master-switch motor will then be closed, by reason of the contact member 356 having been lifted into contact with the contact member 358. The circuit of the master-switch motor is from the source 430, by way of the conductor 440, through the contact members 356 and 358, by way of a conductor 444, to the motor 364; and, by way of the conductor 442, back to the source 430. Rotation of this motor will cause a comparatively slow rotation of the master contact member 365.

When the contact member 365 reaches the point 368, a circuit to the stack release magnet 147 will be closed through the conductor 380, as before described. The circuit may be traced from the conductor 436, by way of a conductor 446, through the rectifier 379, and the switch 294, and the spring 369, to the brush contact member 365. From the contact member 368, the circuit continues, by way of the conductor 380, to the coil 147; from the coil 147, by way of conductors 448 and 450, back to the rectifier 379; and from the rectifier 379, by way of a conductor 452, to the conductor 438. Any papers that happen to be in the magazine 78 will push the stops 86 over, by reason of the armature 145 having been pulled away from the catch 141, and these papers will then pass out of the magazine.

Further rotation of the said main contact member 365 will result in breaking this circuit; and then, when it reaches the contact member 370, will close a circuit to the magnet 290 through the conductor 295 allowing the rolls 132 and 134 to turn and feed out a given length of wrapper into the magazine. The circuit to the contact member 365 is the same as before, by way of the elements 436, 446 and 294; and from the contact member 370, it proceeds by way of the conductor 295 to the coil 290, and from the coil 290, by way of a conductor 454, and the conductor 450, to the rectifier 379 and the conductors 452 and 438.

Next, the main contact member 365 reaches the point 372 and, through the conductor 382, energizes the magnet 384 to effect the rotation of the shaft 386 and, with it, the feeding of the address plates 228, so that the bottom plate in the holder 226 is fed into the printer while the plate in the printer is fed into the selector. The circuit of the coil 384 continues, by way of a conductor 456 and the conductors 454 and 450, back to the rectifier 379.

When the main contact member 365 reaches the point 374, the magnet 291 controlling the printing of the address on the wrapper web 122 is energized through the conductor 297, the other terminal of the coil 291 being connected to the conductor 454 by a conductor 458.

When the main contact member 365 reaches the point 376, the mechanism of the cutter 136 is operated by closing the circuit to the magnet 332 through the conductor 296. This cuts off the wrapper which had previously been fed part way into the magazine by the rolls 132 and 134.

Now that the wrapper is in position in the magazine and the address plate corresponding to that wrapper is alined in the selector, the way is cleared for the papers to start feeding into the magazine 78 from the hopper 6. This is accomplished when the main contact member 365 reaches the point 378, closing the circuit to the magnet 318 through the conductor 392, the circuit continuing from the coil 318 by way of a conductor 460. This results in the dropping of the table 146, lowering the papers in the hopper 6 on to the feed belts 8, and also dropping the rods 186. Dropping of these rods allows the contact member 356 to come out of contact with the contact member 358, thus stopping the control motor 364. The momentum of the motor will carry the main contact member 365 away from the contact member 378, and part way to the contact member 368. As the separated papers feed under the contact arms 44 and 46, the resultant successive contacts of the contact members 166 and 164 will cause intermittent rotation of the counting wheel 218 and, with it, the contact member 283, frictionally mounted on it, through the movements of the pawl 208, induced by the current in the magnet 202 through the conductor 200. The number of contacts of the contact members 166 and 164 necessary before the contact member 283 reaches the contact member 280 depends on the distance they were separated by the selecting arm 262. When the correct number of papers called for by the plate has passed the arms 44 and 46, the contact member 283 will contact the contact member 280. When the contact members 283 and 280 of the selector come together, a circuit will be closed to the magnet 316, which effects the raising of the table 146 and, with it, the rods 186, stopping the feed of papers from the hopper 6. The circuit may be traced from one side of the rectifier 379, by way of the switch 294, in the dotted-line position of Fig. 34, and by way of the conductor 398, to the contact members 283 and 280, and by way of the conductors 320, 458, 454 and 450, to the other side of the rectifier 379. The member 352 is raised again, opening the contact members 360 and 362 to open the circuit to the magnet 316, to prevent overheating, and also closing the contact members 356 and 358, to start the control motor 364 and, with it, the series of events previously described. If it is desired to stop the feed of the papers before the correct number has entered the magazine 78, the switch 294 may be thrown to the position shown in dotted lines in Fig. 34; this will result in closing the circuit to the magnet 316 to raise the table 146 and open the circuit to any of the other relays if they happen to be closed.

To summarize, the illustrative machine comprises feed belts 8, as shown more particularly in Fig. 2, with an agitator 35, juxtaposed with conveyor belts 4 that may feed the newspapers 2 from a press. The shield 10, and the rolls 38 or belts 48 (Fig. 18) serve to separate the newspapers 2 as they are fed out of the hopper 6. The sheets are then counted by a single counting finger, or double contact fingers 44 and 46. The count is predetermined by the peculiarities of the address plates, which are adapted to print addresses on wrappers that go with the sheets, and there is a correlation between the predetermining means and the addressing of the stack. The count may be varied, and there is provision for adjustment on the plate to correspond to different counts.

Separate belts 60, 62 then transfer the newspapers to the magazine 78 though, as before stated, the belts 60 may be integral with the belts 8. The newspapers are held in the magazine 78 by a stop 86, and are held down by various hold-down weights, as illustrated more particularly in Figs. 43 to 50. At the end of a predetermined count, the feed of the papers 2 out of the hopper 6 is stopped, this being effected by raising the table 146 from under the belts 8 at the bottom of the hopper 6, so as to close the gap under the finger 16 of the shield 10. The rolls 38 or the belts 48 are raised at the same time. The resiliency of the finger 16 and the yielding nature of the belts 8 prevents injury to such paper or papers as may be caught between the finger 16 and the raised table 146. The stop 86 is then released to permit the belts 80 to feed the stack of the counted number of papers in the magazine 78 on to the receiving table 140, the movement of the papers on the table 140 being limited by the wall 142. A new stack of papers, corresponding to a new address plate, is then counted off. The resilient construction of the fingers of the stop 86 and the novel clutch mechanism have been described above. As illustrated in Figs. 40 to 42, provision may be made for keeping the stack of newspapers level, by rotating it at intervals.

A full description has been given of the automatically operating, illustrative selector, in conjunction with the addressing device, but it will be understood that the preselection could be effected in other ways. A preferred mechanism for handling the wrappers has also been described for feeding, printing, cutting, and moving into the magazine 78 and, later, with the stack of newspapers, on to the delivery table 140. It will be understood that the wrappers may be fed on to the table from the front or the rear of the machine, as well as from the side.

All the operations are under the control of a master-control unit for synchronizing the operations of the machine.

Further modifications will occur to persons skilled in the art, and all such are considered to fall within the spirit and scope of the invention, as defined in the appended claims.

What is claimed is:

1. Apparatus of the character described comprising a hopper for receiving a plurality of sheets, a belt conveyor at one end of the hopper against which the sheets in the hopper are pressed, the hopper having a wall extending to very close to the conveyor and beyond which the conveyor extends in the direction of travel of the conveyor, but with a space between the conveyor and the wall to permit the conveyor to convey a sheet or sheets from the hopper to outside the hopper in the said direction of travel of the conveyor, the said wall being inclined in the said direction of travel of the conveyor, and the wall being adjustable toward and from the conveyor to adjust the said space between the conveyor and the wall to control the number of sheets that may pass through the space or to accommodate varying thicknesses of the sheets.

2. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, and means for engaging one of the sheets conveyed by the conveyor from the hopper to outside the hopper, and for slowing down its speed of travel to cause the sheets to become lapped or separated.

3. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, means for engaging one of the sheets conveyed by the conveyor from the hopper to outside the hopper and for slowing down its speed of travel to cause the sheets to become lapped or separated, and means for engaging the sheets to count them.

4. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, a roll for engaging one of the sheets conveyed by the conveyor from the hopper to outside the hopper, and means for rotating the roll in the same direction as that of the travel of the conveyor but with a surface speed less than the speed of the conveyor to slow down the speed of travel of the said one sheet to cause the sheets to become lapped or separated.

5. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, a belt for engaging one of the sheets conveyed by the conveyor from the hopper to outside the hopper, and means for actuating the belt in the same direction as that of the travel of the conveyor but with a surface speed less than the speed of the conveyor to slow down the speed of travel of the said one sheet to cause the sheets to become lapped or separated.

6. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, the said wall being inclined in the direction of travel of the conveyor and being provided at its terminal portion near the conveyor with a bent portion extending in the direction of travel of the conveyor.

7. Apparatus of the character described comprising a hopper for receiving a plurality of sheets, and a conveyor for delivering the sheets into the hopper, the hopper having a wall opposite to the conveyor and a wall between the first-named wall and the conveyor and against which the sheets are adapted to be supported.

8. Apparatus of the character described comprising a hopper for receiving a plurality of sheets, a belt conveyor at one end of the hopper against which the sheets in the hopper are pressed, and pulleys over which the conveyor is mounted, one of the pulleys having a projection for agitating the sheets in the hopper.

9. Apparatus of the character described comprising a conveyor for conveying articles in contact therewith in the path of travel of the conveyor, and means for moving the articles out of contact with the conveyor to one side of the said path to prevent the conveyor from conveying the articles.

10. Apparatus of the character described comprising a hopper for receiving a plurality of sheets, a conveyor at one end of the hopper against which the sheets in the hopper are pressed to enable the conveyor to convey out of the hopper the sheet in contact with the conveyor, and means for moving the sheets in the hopper to one side of the conveyor to prevent the conveyor from conveying any of the sheets out of the hopper.

11. Apparatus of the character described comprising a hopper for receiving a plurality of sheets, a plurality of supports constituting a table at one end of the hopper against which the sheets in the hopper are pressed, a plurality of flexible belts disposed between the supports and constituting a conveyor, and means for removing the table to permit the sheets to become pressed against the conveyor to permit the conveyor to convey a sheet or sheets from the hopper to outside the hopper.

12. Apparatus of the character described comprising a hopper for receiving a plurality of sheets, a plurality of belts constituting a conveyor at one end of the hopper against which the sheets in the hopper are pressed, the hopper having a wall extending to very close to the conveyor, but with a space near the conveyor to permit the conveyor to convey a sheets or sheets from the hopper to outside the hopper, a plurality of supports disposed between the belts, and means for moving the supports into contact with the sheets to lift the sheets wholly or partly from the conveyor and to close the space to prevent the conveyor from conveying any of the sheets out of the hopper.

13. Apparatus of the character described comprising a hopper for receiving a plurality of sheets, a plurality of belts constituting a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, a roll for engaging one of the sheets conveyed by the conveyor from the hopper to outside the hopper, a plurality of supports disposed between the belts, means for moving the supports into contact with the sheets to lift the sheets from the conveyor and to close the space to prevent the conveyor from conveying any of the sheets out of the hopper, and means for moving the roll out of engagement with the sheets on the conveyor.

14. Apparatus of the character described comprising a plurality of belts constituting a conveyor for articles to be conveyed, a plurality of supports disposed between the belts constituting a table, means for actuating the table to move the articles off the conveyor, a member for controlling the actuating means, means for counting the articles conveyed by the conveyor, and means controlled by the counting means for effecting the actuation of the member after a predetermined number of the articles have been conveyed by the conveyor.

15. Apparatus of the character described comprising means for feeding material, a shaft, a member for rendering the feeding means respectively effective and ineffective in two different positions of the shaft, a constantly rotating member, a clutch for clutching the constantly rotating member to the first-named member, and means for successively releasing the clutch when the shaft occupies the said two different positions and for thereafter successively rendering the clutch effective.

16. Apparatus of the character described comprising a plurality of belts constituting a conveyor for articles to be conveyed, a plurality of supports disposed between the belts constituting a table, means for actuating the table to move the articles off the conveyor, an eccentric, means for connecting the eccentric to the table to effect the said actuation of the table in one position of the eccentric and to return the table in the other position of the eccentric, a constantly rotating member, a clutch for clutching the constantly rotating member to the eccentric, and means for successively releasing the clutch when the eccentric occupies the said two different positions and for thereafter successively rendering the clutch effective.

17. Apparatus of the character described comprising a magazine, means for feeding sheets into the magazine, means for raising the magazine after a predetermined number of sheets has been fed into the magazine, means for rotating the raised magazine, and means for relowering the rotated magazine.

18. Apparatus of the character described comprising a hopper for receiving a plurality of sheets, a belt conveyor at one end of the hopper against which the sheets in the hopper are pressed, pulleys over which the conveyor is mounted, and means for agitating the lowermost sheets in the hopper.

19. Apparatus of the character described comprising a hopper for containing a plurality of sheets and having a wall extending to very close to one end of the hopper, providing a space near the said end, and means for feeding a sheet or sheets out of the hopper through the said space, the said wall being inclined in the direction of feed of the sheet or sheets and being provided at its terminal portion near the said end with a bent portion extending in the direction of feed.

20. Apparatus of the character described comprising a hopper for holding a plurality of sheets and having a wall extending to very close to one end of the hopper, providing a space near the said end, and means for feeding a sheet or sheets out of the hopper through the said space, a portion of the said wall remote from the said end being inclined in the direction of feed of the sheet or sheets.

21. Apparatus of the character described comprising a hopper for holding a plurality of sheets and having a wall extending to very close to one end of the hopper, providing a space near the said end, means for feeding a sheet or sheets out of the hopper through the said space, and means for engaging one of the sheets fed out of the hopper and for slowing down its speed of travel.

22. Apparatus of the character described comprising a hopper for holding a plurality of sheets and having a wall extending to very close to one end of the hopper, providing a space near the said end, means for feeding a sheet or sheets out of the hopper through the said space, means for engaging one of the sheets fed out of the hopper and for slowing down its speed of travel, and means for counting the sheets fed out of the hopper.

23. Apparatus of the character described comprising a hopper, means for feeding sheets into the hopper to stack them, means for separating the sheets from the stack and feeding them further, and means for counting the separated sheets.

24. Apparatus of the character described comprising a hopper for holding a stack of sheets, a conveyor at one end of the hopper against which the sheets in the hopper are pressed, and means for agitating the lowermost sheets in the hopper.

25. Apparatus of the character described comprising a hopper for receiving a plurality of sheets, a conveyor at one end of the hopper against which the sheets in the hopper are pressed, the hopper having a wall extending very close to the conveyor, but with a space near the conveyor to permit the conveyor to convey a sheet or sheets from the hopper to outside the hopper, a portion of the wall remote from the conveyor being inclined toward the conveyor in the direction of travel of the conveyor, and the wall being adjustable to control the number of sheets that may pass through the space or to accommodate varying thicknesses of the sheets.

26. Apparatus of the character described comprising a magazine, means for feeding sheets into the magazine, means for raising the magazine after a predetermined number of sheets has been fed into the magazine, means for moving the raised magazine, and means for relowering the moved magazine.

27. Apparatus of the character described comprising a hopper for receiving a plurality of sheets, and a conveyor for delivering the sheets into the hopper, the hopper having a wall opposite to the conveyor and a wall between the first-named wall and the conveyor and against which the sheets are adapted to be supported, the conveyor and the wall opposite thereto being both inclined in the same direction.

28. Apparatus of the character described comprising a magazine, means for feeding sheets into the magazine, and means controlled by the feeding means for rotating the magazine after a predetermined number of sheets has been fed into the magazine.

29. Apparatus of the character described comprising a hopper for containing a stack of sheets, a conveyor at one end of the hopper, there being an opening in the wall of the hopper near the conveyor to permit the conveyor to convey a sheet or sheets out of the hopper through the space of the opening, and means for closing the opening to prevent the conveyor from conveying sheets through the said space.

30. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, and means for blocking the space to prevent sheets from passing through the space.

31. Apparatus of the character described comprising a hopper for receiving a plurality of sheets, a conveyor at one end of the hopper against which the sheets in the hopper are pressed, the conveyor comprising a plurality of belts, a plurality of supports disposed between the belts and constituting a table adapted to occupy an ineffective position, the hopper having a wall extending to very close to the conveyor, but with a space near the conveyor to permit the conveyor to convey a sheet or sheets from the hopper to outside the hopper, and means for actuating the table to an effective position to cause it to move the sheets off the belts and to block the said space.

32. Apparatus of the character described comprising a hopper for receiving a plurality of sheets, a conveyor at one end of the hopper against which the sheets in the hopper are pressed, the hopper having a wall extending to very close to the conveyor, but with a space near the conveyor to permit the conveyor to convey a sheet or sheets from the hopper to outside the hopper, a counter for counting the sheets conveyed by the conveyor from the hopper through the said space to outside the hopper, and means controlled by the counter for blocking the said space to prevent the sheets from passing through the said space at the end of the conveying of a predetermined number of the said sheets through the said space.

33. Apparatus of the character described comprising a plurality of belts constituting a conveyor for articles to be conveyed, a plurality of supports disposed between the belts constituting a table, and means for actuating the table to move the articles off the conveyor.

34. Apparatus of the character described comprising a conveyor for conveying sheets from under a stack of sheets resting on the conveyor, a counter for counting the sheets conveyed by the conveyor, and means controlled by the counter for lifting the stack of sheets off the conveyor at the end of the conveying of a predetermined number of the sheets by the conveyor.

35. Apparatus of the character described comprising a constantly rotating drum, a spring coiled around the drum and tensioned to engage frictionally thereagainst, a disk to which one end of the spring is fastened and having a lug, a member to which the other end of the spring is fastened, whereby the disk, the member and the spring will rotate with the constantly rotating drum, a magnet having an armature adapted normally to engage the lug to hold the disk against rotation to cause it to release the tension of the spring on the constantly rotating drum, whereby the disk, the member and the spring will not rotate with the constantly rotating drum when the armature engages the lug, and means for energizing the magnet to actuate the armature and release the lug.

36. Apparatus of the character described comprising a constantly rotating drum, a spring coiled around the drum and tensioned to engage frictionally thereagainst, a disk to which one end of the spring is fastened and having a lug, a member to which the other end of the spring is fastened, whereby the disk, the member and the spring will rotate with the constantly rotating drum, two magnets each having an armature adapted normally to engage the lug to hold the disk against rotation to cause it to release the tension of the spring on the constantly rotating drum, whereby the disk, the member, and the spring will not rotate with the constantly rotating drum when either armature engages the lug, the armature being positioned to hold the member in each of two separate positions, and means for energizing the magnets to actuate the respective armatures and release the lug.

OTTO E. WOLFF.